United States Patent [19]

Nishinohara et al.

[11] Patent Number: 6,082,847
[45] Date of Patent: *Jul. 4, 2000

[54] IMAGE SYSTEM WITH INFORMING MEANS

[75] Inventors: Takayuki Nishinohara; Atsushi Saito; Keizo Sasai, all of Yokohama; Hiroshi Ogushi, Shiroi-machi; Takeshi Kohno, Kawasaki; Takashi Ono, Yokosuka; Fumihiko Nakamura, Tokyo; Katsumi Obana, Funabashi, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/706,435

[22] Filed: Aug. 30, 1996

[30] Foreign Application Priority Data

Sep. 1, 1995 [JP] Japan ................................. 7-225187
Sep. 1, 1995 [JP] Japan ................................. 7-225190

[51] Int. Cl.$^7$ .................................................. H04N 1/034
[52] U.S. Cl. ........................... 347/19; 347/3; 347/43; 358/434; 358/502
[58] Field of Search ........................... 400/174, 175; 347/3, 19, 49, 85–87, 43; 358/296, 434, 502

[56] References Cited

U.S. PATENT DOCUMENTS

| | | | |
|---|---|---|---|
| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/66 |
| 4,608,577 | 8/1986 | Hori | 347/66 |
| 4,723,129 | 2/1988 | Endo et al. | 347/56 |
| 4,740,796 | 4/1988 | Endo et al. | 347/56 |
| 4,872,027 | 10/1989 | Buskirk et al. | 347/19 |
| 5,030,317 | 7/1991 | Noguchi | 216/27 |
| 5,621,540 | 4/1997 | Terajima | 358/404 |
| 5,623,289 | 4/1997 | Ono et al. | 347/3 |
| 5,715,506 | 2/1998 | Takeuchi et al. | 399/303 |
| 5,727,136 | 3/1998 | Kubota | 395/114 |

FOREIGN PATENT DOCUMENTS

| | | |
|---|---|---|
| 54-56847 | 5/1979 | Japan . |
| 59-123670 | 7/1984 | Japan . |
| 59-138461 | 8/1984 | Japan . |
| 60-71260 | 4/1985 | Japan . |
| 62-253457 | 11/1987 | Japan . |

Primary Examiner—John Barlow
Assistant Examiner—Craig A. Hallacher
Attorney, Agent, or Firm—Fitzpatrick, Cella, Harper & Scinto

[57] ABSTRACT

An image recording apparatus is capable of mounting a replaceable monochromatic recording head or color recording head and has a function to discriminate a type of the recording head mounted on a carriage. When a facsimile mode is selected and the mounted recording head is discriminated as the color recording head, a display is made on a display of a console panel to indicate the exchange of the recording head to the monochromatic recording head.

72 Claims, 20 Drawing Sheets

FIG. 6

| FIG. 6A | FIG. 6B |
|---------|---------|

FIG. 6A

- FAX MODE (S1)
- BLACK CARTRIDGE? → YES → A
  - NO (COLOR CARTRIDGE)
- DISPLAY ON LCD "Exchange Color Cartridge For Black Cartridge" (S10)
- RECORD UNIT ACTUATED? (S11) → NO ↺
  - YES
- RECEIVE IN FAX MODE? (S12)
  - NO (COPY MODE)
    - RECORD ONE PAGE (S16)
    - NEXT PAGE PRESENT? (S17) → YES ↺ / NO
  - YES
    - RECORD ONE PAGE BY 64 NOZZLES (S13)
    - INK EMPTY? (S14)
      - YES → B
      - NO
        - NEXT PAGE PRESENT? (S15) → YES ↺ / NO

- B → ERROR PROCESS (S9) → END

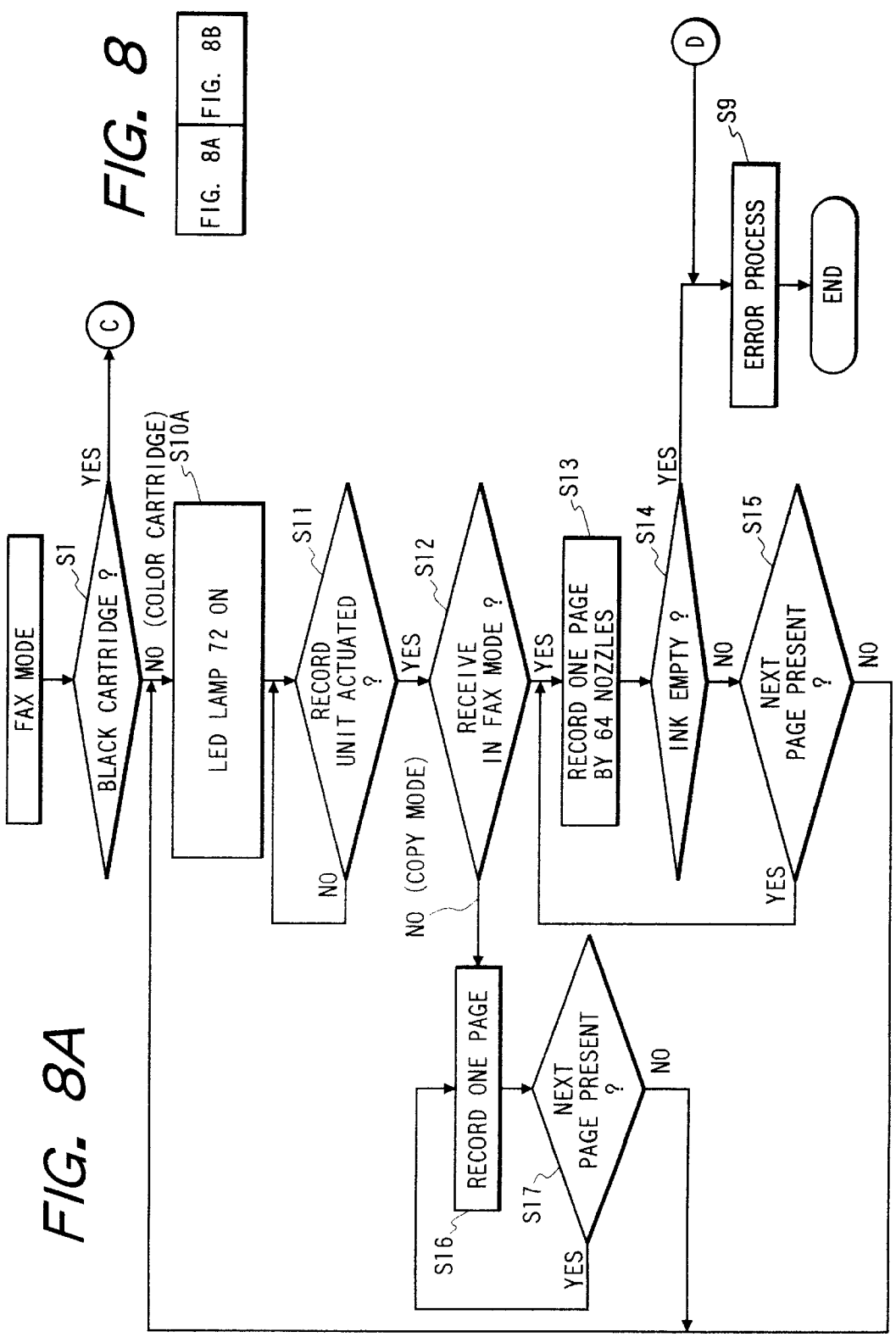

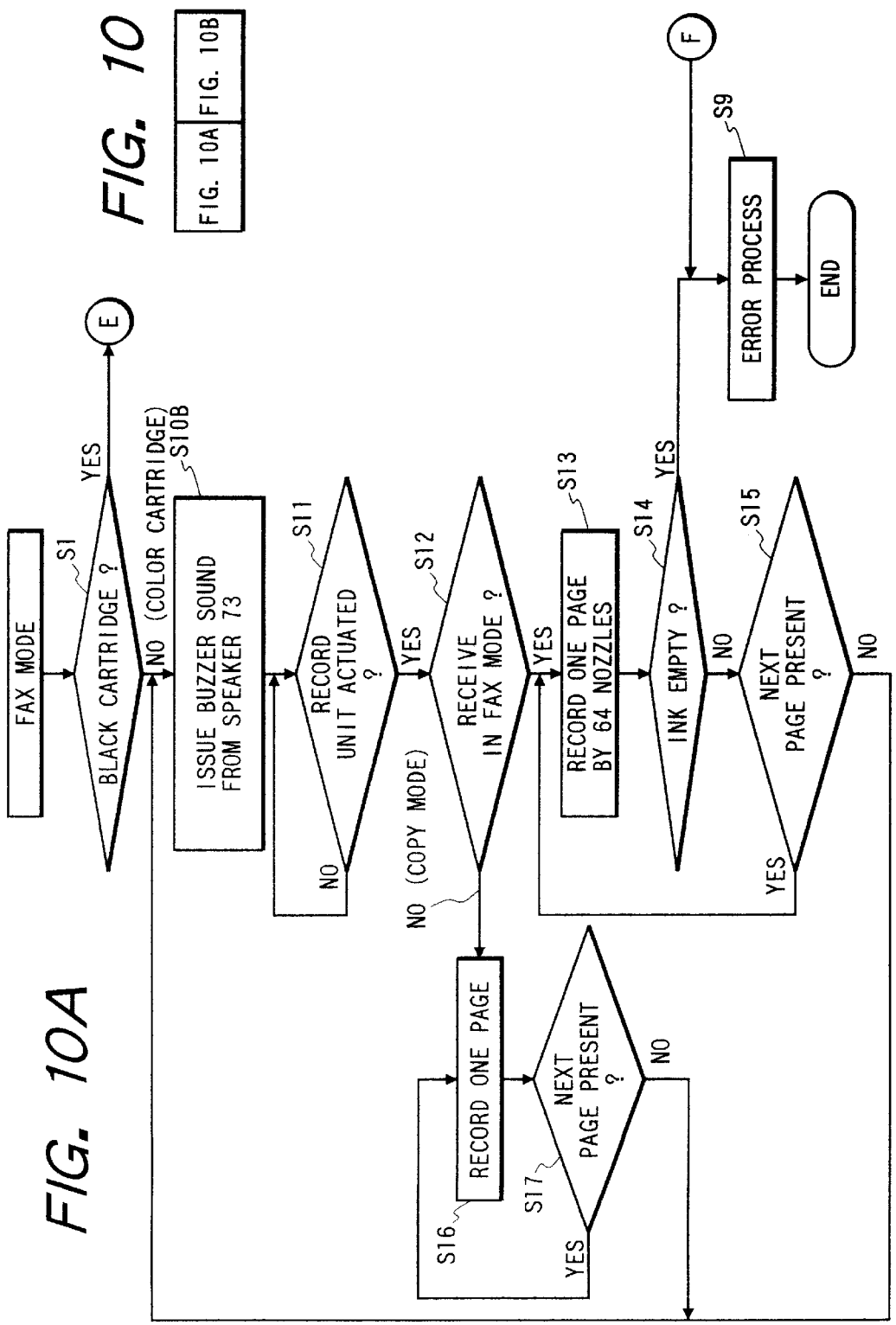

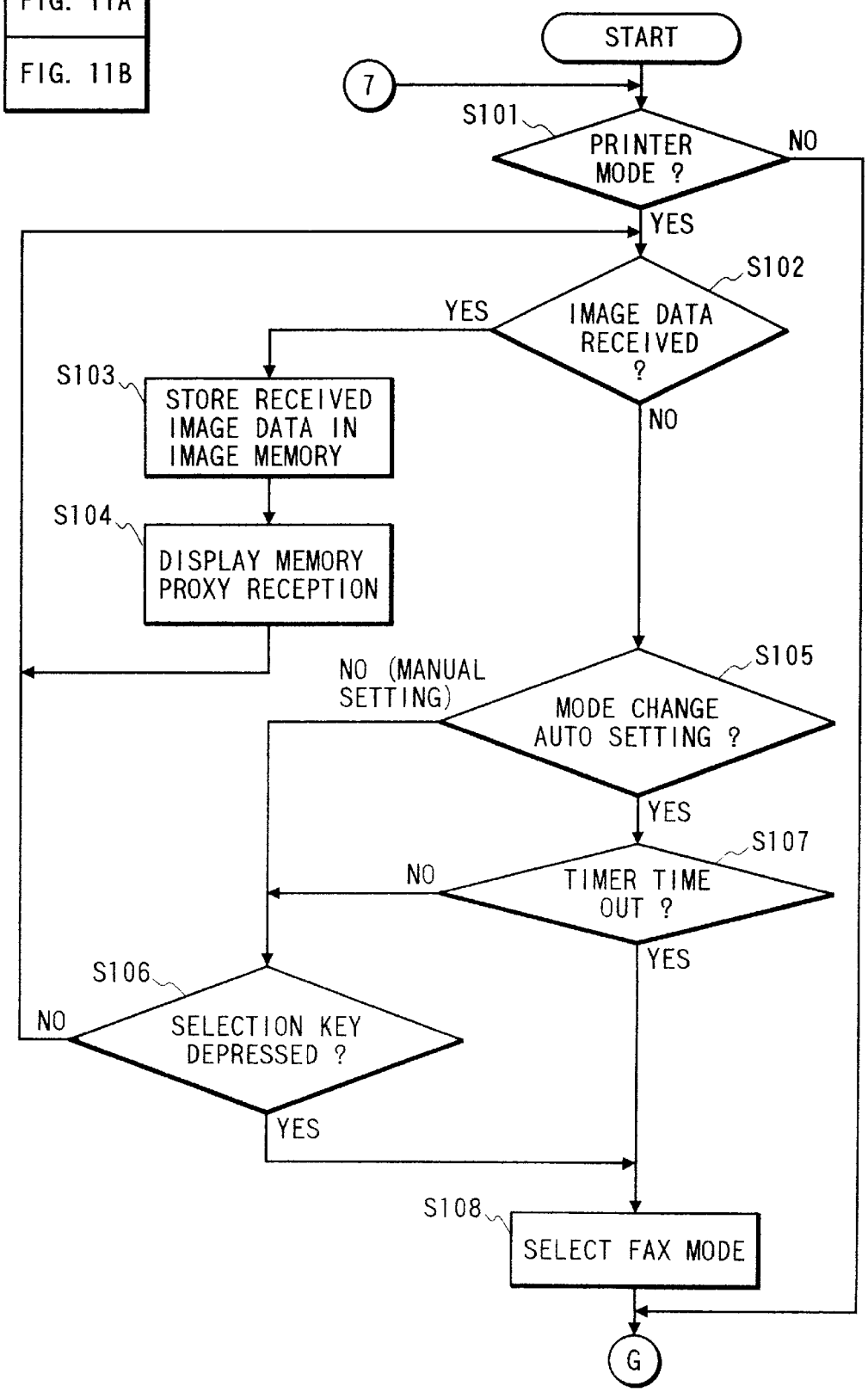

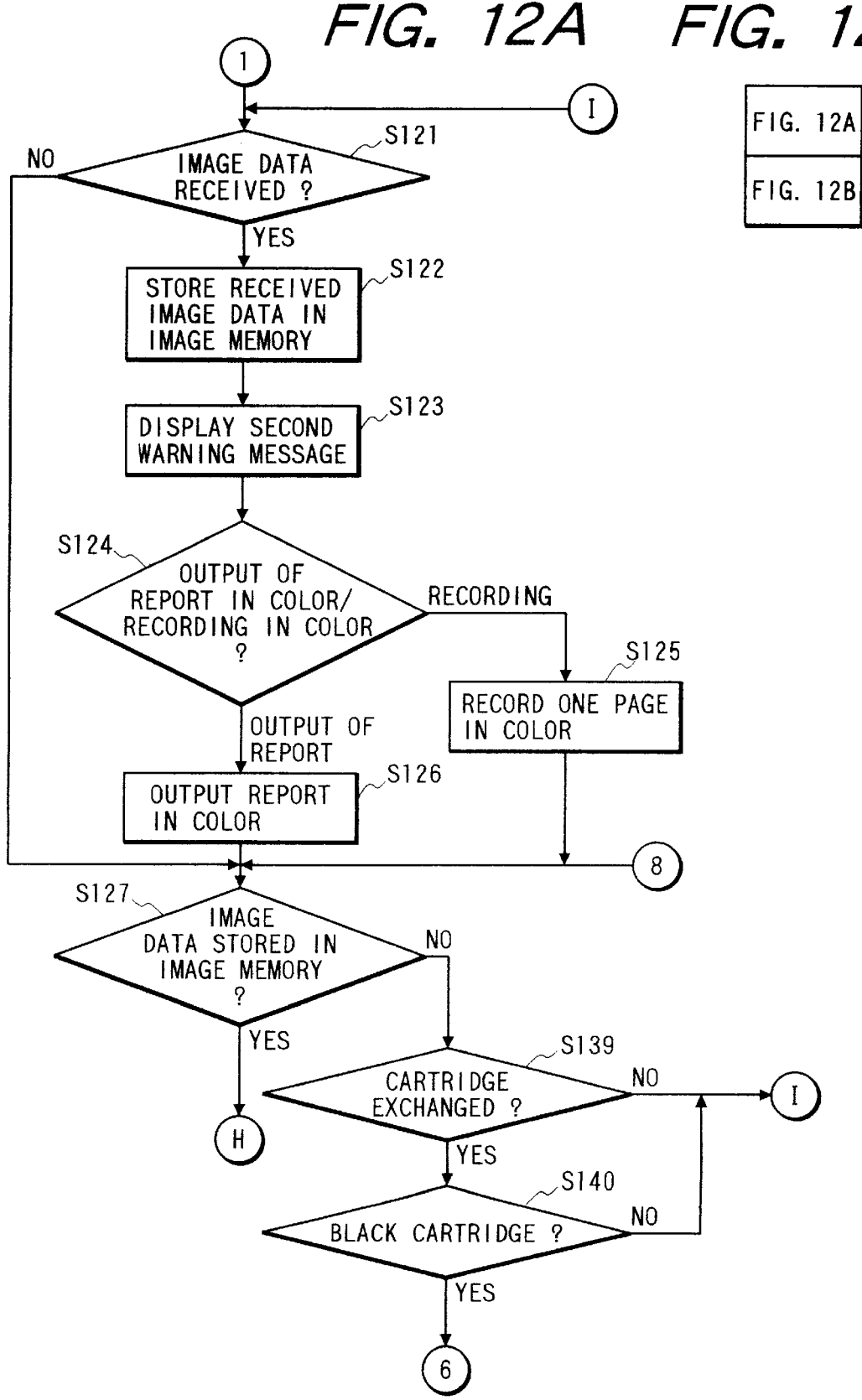

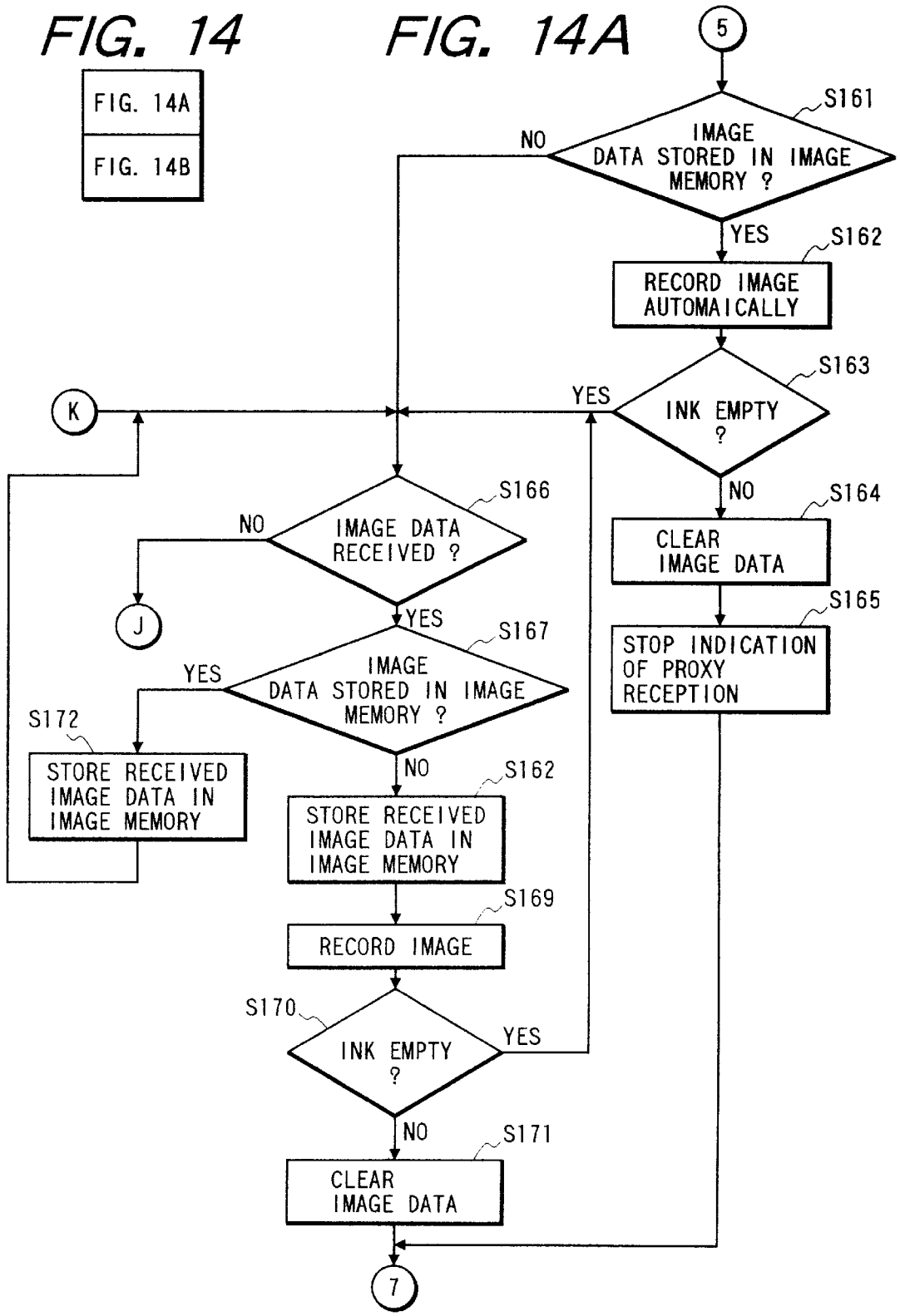

IMAGE SYSTEM WITH INFORMING MEANS

BACKGROUND OF THE INVENTION

1. Field of the Invention

The present invention relates to a recording apparatus and a facsimile apparatus using the recording apparatus, and more particularly to an image recording apparatus capable of selectively using a monochromatic recording head and a color recording head and a facsimile apparatus using the image recording apparatus.

2. Related Background Art

In a recording apparatus which uses an exchangeable cartridge type recording head for discharging ink in accordance with a conventional ink jet system and on which a monochromatic recording head is mounted for monochromatic recording and a color recording head is mounted for color recording, it is necessary to determine whether the mounted cartridge is the color recording head or the monochromatic recording head by a CPU in the apparatus or by opening a cover of the apparatus and visually checking the cartridge by a user of the apparatus.

Since the user of the apparatus cannot identify from an external appearance whether the color recording head cartridge is mounted or the monochromatic recording cartridge is mounted, the prior art has the following shortcoming.

Ink orifices of the recording head of the recording apparatus apt to be clogged with ink by the drying of the ink. So, the failure in ink discharge due to the drying of the ink should be prevented by consuming a small amount of ink by ink suction or preliminary discharge (ink discharge not related to recording) at a constant interval.

It is desired from a standpoint of the effective use of apparatus resource to design a facsimile apparatus having a recording unit for recording by using the exchangeable cartridge type color or monochromatic recording head for discharging ink in accordance with the ink jet system as described above, so as to utilize the record unit of the facsimile apparatus as a printing apparatus, too. However, in such a dual function apparatus which may work as either a facsimile machine or a printer, it is necessary to have a facsimile mode for transmitting and receiving facsimile image information in accordance with the G3 protocol and a printer mode to record information supplied from an external computer, but the provision of such two modes causes the following problem.

Namely, in the facsimile mode, since color image information is not received, color ink is not used in recording received information. However, where the color recording cartridge is mounted, the color ink is wastefully consumed by the preliminary discharge or the suction of the color ink to avoid the failure in color ink discharge although the color ink is not used for recording facsimile image information.

If the user of the apparatus does not notice externally from the apparatus that a type of the mounted cartridge is the color recording head, the color ink in the mounted cartridge is consumed while the user does not notice it, and if such a condition lasts long, the color ink is exhausted in spite of the fact that the color ink is not actually used in the recording.

SUMMARY OF THE INVENTION

It is an object of the present invention to provide an improved image recording apparatus and a facsimile apparatus using such an image recording apparatus.

It is another object of the present invention to provide an image recording apparatus with improved operability and a facsimile apparatus using such an image recording apparatus.

It is still another object of the present invention to provide an image recording apparatus capable of identifying a type of a cartridge from exchangeable cartridge type monochromatic recording head and color head and promoting to a user of the apparatus the exchange thereof if necessary, and a facsimile apparatus using such an image recording apparatus.

It is still another object of the present invention to provide an image recording apparatus which is operable in a plurality of operation modes and informs the exchange of a recording head in accordance with a result of the selection of the operation mode and the type of the mounted recording head, and a facsimile apparatus using such an image recording apparatus.

It is still another object of the present invention to provide an image recording apparatus capable of preventing the unnecessary consumption of recording agent and a facsimile apparatus using such an image recording apparatus.

It is still another object of the present invention to provide an image recording apparatus which allows the selection of storing received data in memory means when a color recording head is mounted and a facsimile apparatus using such an image recording apparatus.

It is still another object of the present invention to provide an image recording apparatus which allows the selection of informing the exchange of a recording head and a facsimile apparatus using such an image recording apparatus.

The above and other objects of the present invention will be apparent from the following description and the accompanying drawings.

DETAILED DESCRIPTION OF THE PREFERRED EMBODIMENTS

A facsimile apparatus in accordance with the present invention is now explained.

Figure 1:
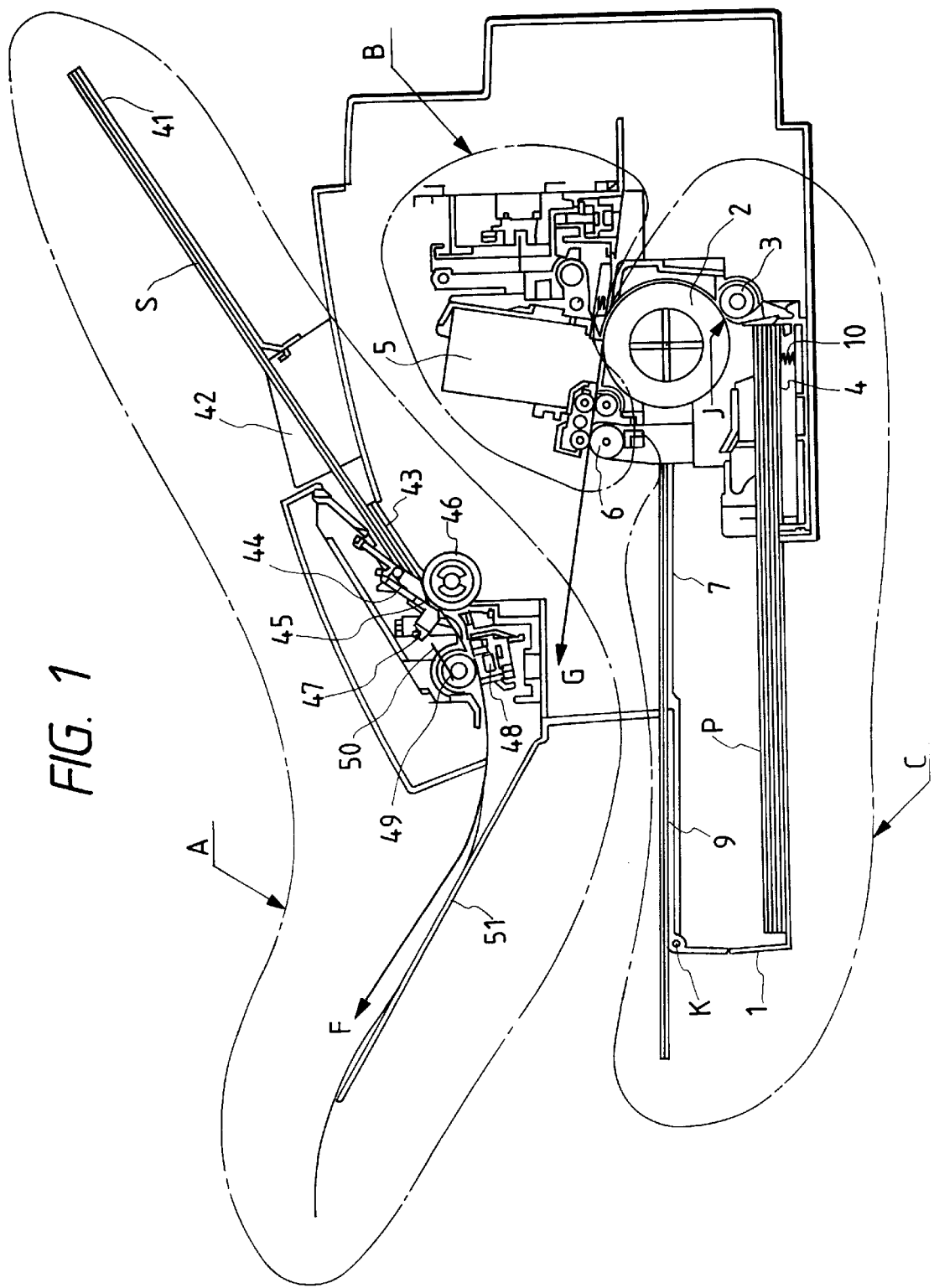
FIG. 1 shows a side sectional view of a construction of a facsimile apparatus having a recording unit for recording by a recording head in accordance with an ink jet system in a typical embodiment of the present invention.

FIG. 1 shows a side sectional view of a construction of a facsimile apparatus having a recording unit for recording by an ink jet system in accordance with a typical embodiment of the present invention. Either a cartridge type monochromatic recording head or a cartridge type color recording head is mounted on the recording unit. The monochromatic recording head and the color recording head are exchangeable. The facsimile apparatus has two modes, a facsimile mode to operate the apparatus as a facsimile apparatus and a printer mode for receiving data from an external computer to print it out. The two modes are switched by the manipulation of a console panel to be described later.

Referring to FIG. 1, a general construction of the facsimile apparatus is explained. In FIG. 1, A denotes a read unit for optically reading a document sheet, B denotes a record unit for recording in accordance with the ink jet system, and C denotes a sheet feed unit for separating recording media such as record sheets P stacked on a sheet feed cassette one by one and feeding it to the record unit B.

First, a flow of the record sheet P is explained.

A transfer path of the record sheet P is shown by an arrow G. Namely, the record sheet P stacked on a sheet feed cassette 1 of a sheet feed unit C is picked up by a sheet feed roller 2 and a retard roller 3 and fed to the record unit B by the sheet feed roller 2. The record unit B discharges ink to the record sheet P by a recording head 5 for recording and at the same time transfer the record sheet P in timed relation to the recording. When the recording is completed, the record sheet P is ejected and stacked to a sheet ejection stacker 7 by a sheet ejection roller 6.

A specific construction of the sheet feed unit C is explained.

In FIG. 1, the sheet feed cassette 1 in which a plurality of record sheets P are stacked and accommodated has a middle plate 4 on which the record sheet P are mounted. The middle plate 4 is biased upward from a read side thereof by a middle plate spring 10 which is disposed on the opposite side to the sheet feed roller 2. The middle plate 4 is constructed to be pushed down by a cam in a sheet feed stand-by state to allow easy supplement of the record sheets P when the record sheets P are exhausted or almost exhausted.

On the other hand, when a record signal is detected or a sheet feed operation is to be started, the downward press of the middle plate 4 by the cam is released and the record sheet P is picked up by the sheet feed roller 2. The retard roller 3 is disposed to face the sheet feed roller 2 and it is linked to the middle plate 4 to change the position of the record sheet P. When the sheet feed operation is to be conducted, only the topmost one of the record sheets P which is biased by the middle plate 4 and picked up by the sheet feed roller 2 is separated by the cooperation of the sheet feed roller 2 at a position J. The separated and fed record sheet P is transported to the record unit B while it is pinched to fully wrap around the sheet feed roller 2.

An ejection operation of the record sheet P having recorded at the record unit B is explained.

The record sheet P ejected by the sheet ejection roller 6 is ejected and stacked on the sheet ejection stacker 7. The sheet ejection stacker 7 is provided with a sheet ejection auxiliary tray 9 to rotate around a hinge K and it is rotated when the record sheet P is long to extend the sheet ejection stacker in a directing of the record sheet ejection. The sheet ejection stacker 7 also serves as a cover of the sheet feed cassette 1. A plurality of ribs (not shown) are provided in the sheet ejection stacker 7 and the sheet ejection auxiliary tray 9 and the record sheet P having record made thereon slides on the ribs and sequentially stacked.

A flow of an image document sheet S is explained.

A document sheet transport path is shown by an arrow F in FIG. 1. In FIG. 1, the image document sheet S is stacked on a document sheet stack tray 41. The image document sheet S stacked on the document sheet stack tray 41 is positioned by a slider 42 which is movable along the width thereof. When the image document sheet S is stacked on the document sheet stack tray 41, the document sheet is pressed downward by a preliminary transfer spring 44 through a preliminary transfer press member 43, and it is plowed by the cooperation with a separation roller 46 and preliminarily transferred.

The preliminarily transferred image document sheets S are separated one by one, starting form the bottom one, by the cooperation of a separation member 45 and the separation roller 46 which is pressed downward by an ADF spring 47. The separation roller 46 also serves to transport the separated image document sheet S to the read position. The image drawn on the image document sheet S which is separated and transported to the read position by the separation roller 46 is read by a photo-electric sensor 48. A CS roller 49 is biased downward by a CS press spring 50 along a read line of the photo-electric sensor 48 and contacts the separated and transported image document sheet S to the read line. The CS roller 49 also determines a read velocity of the image document sheet S along a sub-scan direction (transport direction of the image document sheet) and ejects the image document sheet S for which the reading is completed. Finally, the ejected image document sheet S is ejected and stacked to a document sheet ejection tray 51. The document sheet ejection tray 51 is constructed to be removably mounted on the apparatus.

Figure 2:
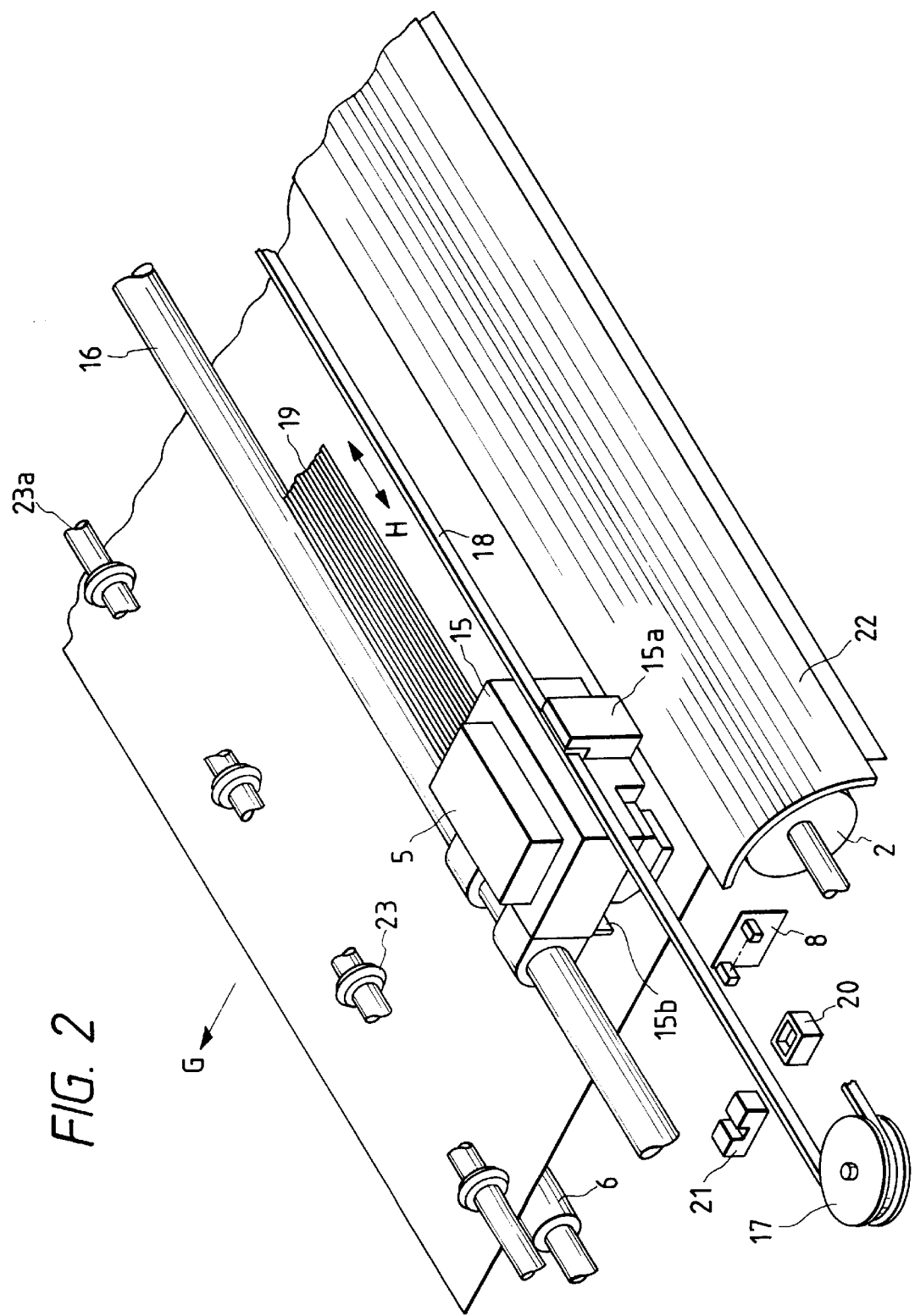
FIG. 2 shows a three-dimensional perspective view of a detailed construction of a recording unit B of the apparatus shown in FIG. 1.

FIG. 2 shows a three-dimensional perspective view of a detailed construction of the record unit B. As shown in FIG. 2, the recording head 5 has an ink tank therein and it is a cartridge type recording head which may be replaced with a new one when the ink is exhausted. The recording head 5 has two types, a cartridge with a monochromatic recording head and a cartridge with a color recording head, and either one may be exchangeably mounted. In this implementation, the monochromatic recording head has a resolution of 360 DPI and a nozzle line comprising 128 nozzles, and discharges ink from an orifice at an end of the nozzle by a film boiling pressure generated in the ink by the heat generation of an electro-thermal transducer element disposed in the nozzle. On the other hand, the color recording head has black ink discharging nozzles and color ink discharging nozzles, and the black ink discharging nozzles comprise 64 nozzles and the color ink (cyan, magenta and yellow) discharging nozzles comprise 24 nozzles for each of the above three color inks. Those nozzles are arranged in line.

A principle to discharge the ink is described below and it is same for the monochromatic recording head and the color recording head. The color recording head has two ink tanks, one for the black ink and the other for the color ink and the ink tanks may be independently replaced.

A principle to discharge the ink from the recording head is explained. The recording head generally comprises fine liquid orifices, a liquid path, an energy action unit provided at a portion of the liquid path and an energy generation unit for generating droplet forming energy to be acted on the liquid in the action unit.

The energy generation unit may use an electromechanical transducer such as a piezo-electric element, may irradiate an electromagnetic wave such as a laser beam which is absorbed by the liquid to generate head and droplets are discharged and flown by the action of heat, or may heat the liquid by an electro-thermal transducer to discharge the liquid. Among others, the recording head which uses the system to discharge the liquid by the thermal energy can attain recording at a high resolution because the liquid orifices for forming the flying droplets by discharging the recording droplets may be arranged at a high density.

The recording head which uses the electro-thermal transducer may be readily formed in compact, can fully utilize the merits of the IC technology and the micro-machining technology which have been remarkably advanced in the technology and the reliability in the recent semiconductor field, and is easy to manufacture an elongated head or two-dimensional head. Accordingly, it may be easily made multi-nozzle form or high density packaging, and mass production is easily attained and a manufacturing cost is reduced.

The recording head which uses the electro-thermal transducer at the energy generation unit and manufactured by the semiconductor manufacturing process is generally provided with a liquid path for each ink orifice, and an electro-thermal transducer as means for forming flying droplets by discharging the liquid from the corresponding ink orifice by acting the thermal energy to the liquid filled in the liquid path is provided for each liquid path, and the liquid is supplied to each liquid path from a common liquid chamber coupled to each liquid path.

A method for manufacturing the ink orifice is disclosed in JP-A-62-253457 in which a solid layer for forming at least a liquid path on a first substrate, an active energy beam cured or hardened material layer used to form a wall of the liquid path and a second substrate are sequentially stacked on a first substrate, then a mask is stacked on the second substrate, an active energy beam is irradiated to the top of the mask to cure at least a wall forming portion of the liquid path of the active energy beam cured material layer, and the solid layer and an uncured portion of the active energy beam cured material are removed from the area between the two substrates to form the liquid path.

Referring to FIG. 2, a construction of the record unit B is explained.

In FIG. 2, a carriage 15 precisely holds the recording head 5 and reciprocally drives it in a direction (main scan direction shown by an arrow H) transverse to the transport direction of the record sheet P (sub-scan direction shown by an arrow G). The carriage 15 is slidably held by a guide rod 16 and an abutment 15a. The reciprocal movement of the carriage is conducted by a pulley 17 driven by a carriage motor 30 (not shown) and a timing belt 18, and a recording signal and power supplied to the recording head 5 are supplied from an electrical circuit of the apparatus through a flexible cable. The recording head and a flexible cable 19 are connected with contacts thereof press-contacted to each other, and a CPU to be described later can determine whether the monochromatic recording cartridge is mounted or the color recording cartridge is mounted by detecting the open/connection between particular contacts of the recording head 5.

A cap 20 is provided at a home position of the carriage 15 of the record unit B to serve as ink receive means. The cap 20 is moved up and down as required, and when it is moved up, it contacts to the recording head 5 to cover the nozzles to prevent the evaporation of the ink and the deposition of dusts.

In such an apparatus, in order to position the recording head 5 and the cap 20 to face each other, a carriage home sensor 21 provided in the apparatus main unit and a light shielding plate 15b provided in the carriage 15 are used. The carriage home sensor 21 uses a transmissive photo-interrupter and when the carriage moved to a stand-by position, the transmission of the emitted light from a portion of the carriage home sensor 21 is interrupted by the light shielding plate 15b. By making use of this fact, the positioning of the recording head 5 and the cap 20 at the facing position is detected.

The record sheet P is fed from the bottom to the top in the drawing and bent horizontally by the sheet feed roller 2 and a sheet guide 22 and transported in a direction G (sub-scan direction). The sheet feed roller 2 and the sheet ejection roller 6 are driven by a record motor (not shown) and transport the record sheet P at a high precision in the sub-scan direction in cooperation with the reciprocal movement of the carriage 15. A spur 23 made of a high water-repelling material and contacts with the record sheet P at only a knife-edge circumference is provided in the sub-scan direction. A plurality of such spurs are provided by a bearing member 23a to face the sheet ejection roller 6 at a predetermined interval in the main scan direction so that the record sheet P is guided and fed without being affected to the image thereof even if it contacts an unfixed image on the record sheet immediately after the recording.

Figure 3:
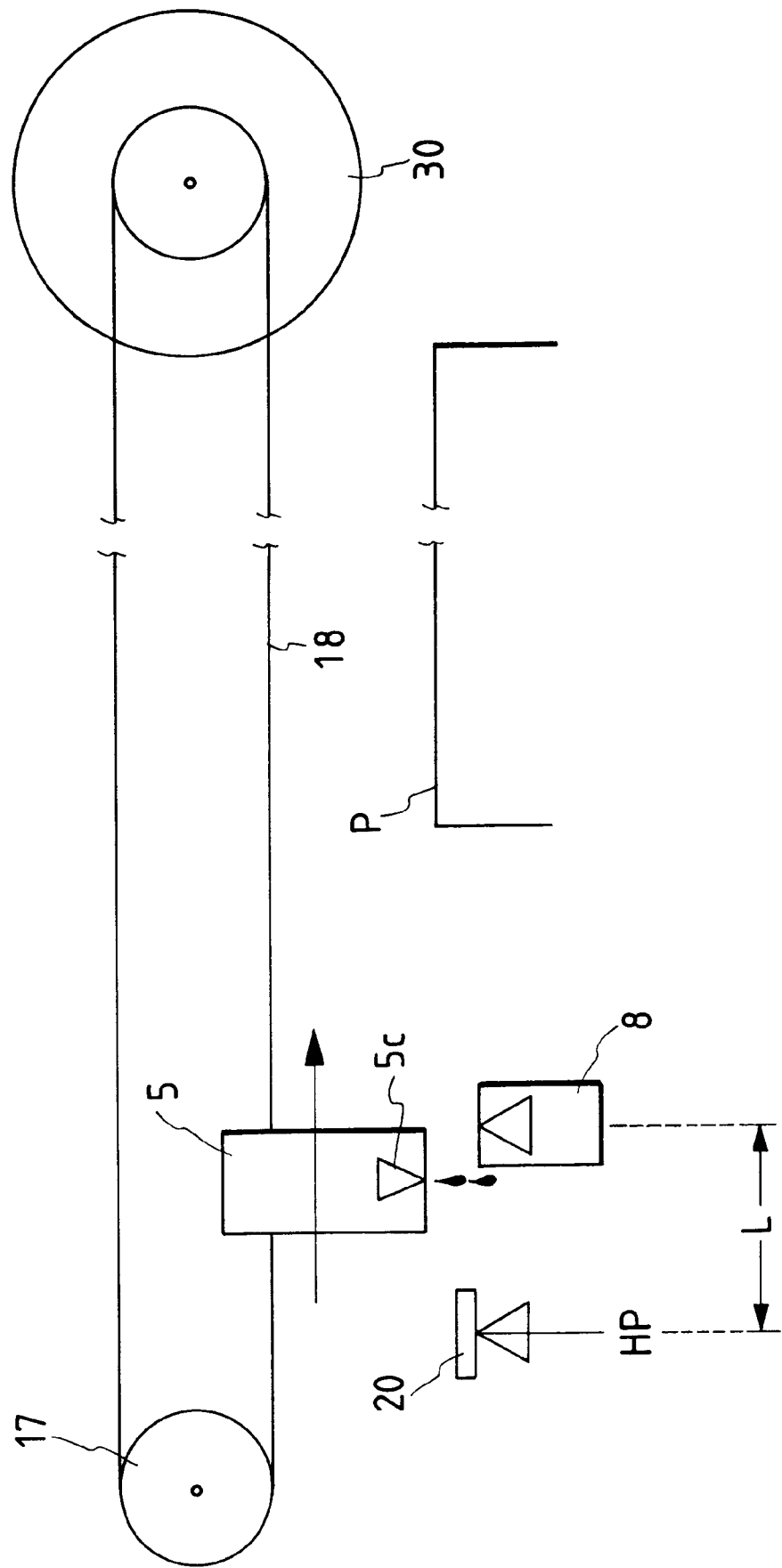
FIG. 3 shows a detailed construction around a photo-sensor 8 of the recording unit B.

As shown in FIG. 3, a photo-sensor 8 is a transmission type photo-interrupter arranged between the cap 20 and the end of the record sheet P at a position facing a nozzle line 5c of the recording head for directly and optically detecting the ink droplets discharged from the nozzles of the recording head 5, and the absence of ink of the recording head 5 is determined based on the output thereof. The photo-sensor used here has an infrared LED as a light emitting element, a lens is integrally formed on an LED light emitting surface and a light is emitted substantially collimately toward a photo-sensing element. The photo-sensing element uses a phototransistor, a hole of 0.7 mm×0.7 mm is formed on an optical axis on the photo-sensing plane of the photo-sensing element by a mold member, and a detection range between the photo-sensing element and the light emitting element is confined to 0.7 mm height and 0.7 mm width. The optical axis connecting the light emitting element and the photo-sensing element is arranged parallelly to the nozzle line 5c of the recording head 5, the spacing between photo-sensing elements is larger than the nozzle line 5c of the recording head 5, and when the optical axis and the nozzle line 5c of the recording head 5 align, all ink droplets discharged from the nozzles of the recording head 5 can pass the detection range between the light emitting element and the photo-sensing element. When the ink droplets pass through the detection range, the ink droplets interrupt the light from the light emitting element to reduce the light intensity at the photo-sensing element so that the output of the photo-sensor as the photo-sensing element is changed.

In order to position the nozzle line of the recording head 5 and the photo-sensor to face each other, the carriage home sensor 21 provided in the apparatus main unit is used as it is in the positioning to the cap 20.

In the present embodiment, a distance (L) of movement from the position of the nozzle line 5c of the recording head 5 at the home position (HP) as shown in FIG. 3 to the optical axis of the photo-sensor 8 is converted to the number of steps of the motor which drives the carriage 15 and it is set as a constant in a control program to execute the record operation. In this manner, by moving the carriage by a predetermined distance after the detection of the home position, the ink line of the recording head 5 and the optical axis of the photo-sensor 8 are precisely positioned to face each other.

Figure 4:
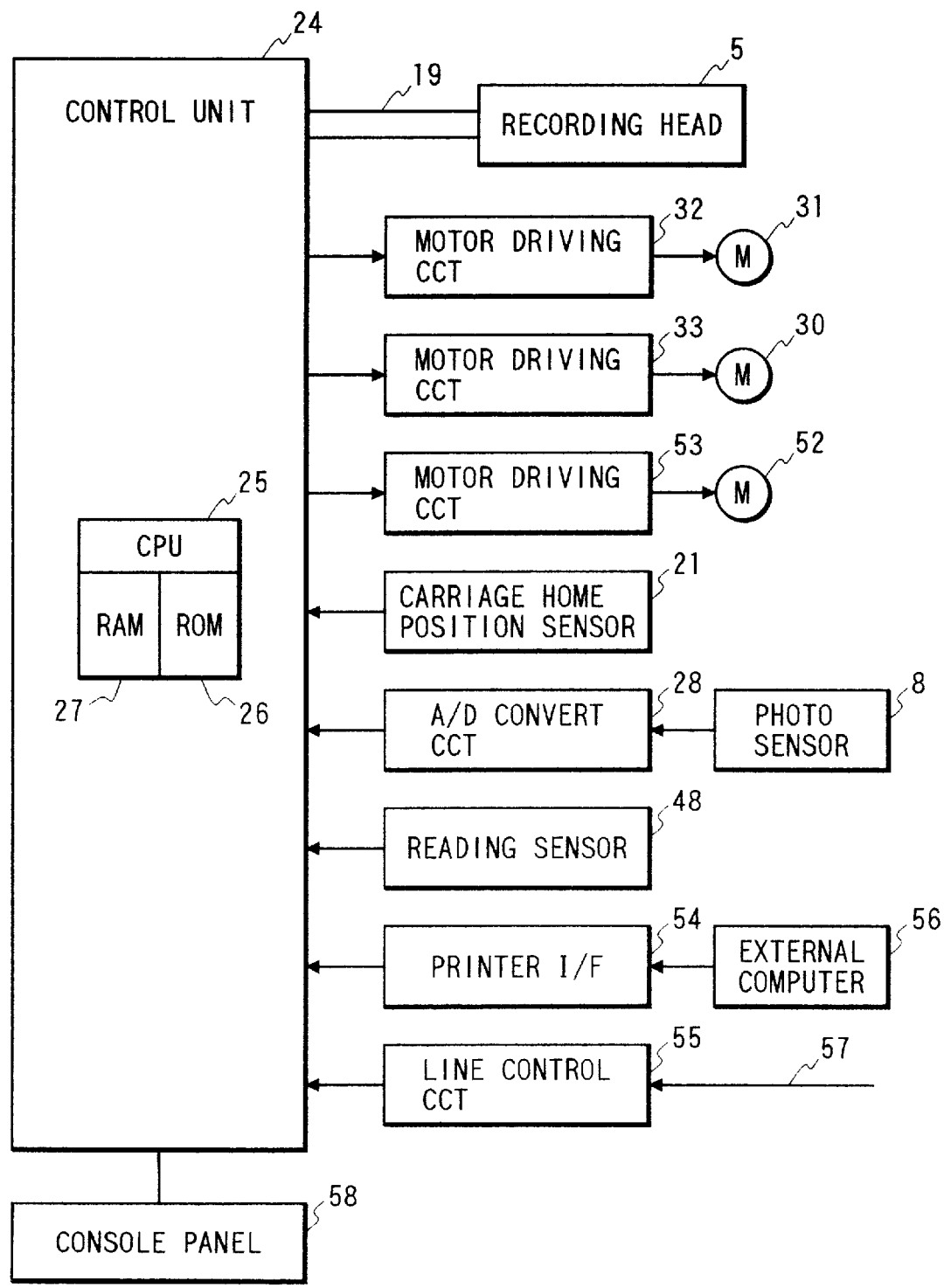
FIG. 4 shows a block diagram of a control unit of the facsimile apparatus shown in FIG. 1.

FIG. 4 shows a block diagram of a control configuration of the facsimile apparatus shown in FIG. 1.

In FIG. 4, numeral 24 denotes a control unit for controlling the overall apparatus. The control unit 24 comprises a CPU 25, a ROM 26 for storing a control program to be executed by the CPU 25 and various data and a RAM 27 to be used by the CPU 25 as a working area to execute various processes and to temporarily store various data.

As shown in FIG. 4, the recording head 5 is connected to the control unit 24 through the flexible cable 19 which includes a control signal line from the control unit 24 to the recording head 5, an image signal line and a signal line for outputting a signal to identify whether the recording head 5 is the monochromatic recording head or the color recording head. The output of the photo-sensor 8 is digitized by an A/D converter 28 and decoded by the CPU 25. A carriage motor 30 is rotated by the number of pulse steps by a motor drive circuit 32. The control unit 24 controls the carriage motor 30 through a motor drive circuit 33, the transport motor 31 through the motor drive circuit 32 and a read motor 52 through a motor drive circuit 53, and receives the output from the carriage home sensor 21.

The control unit 24 connects the read sensor 48, a printer interface 54 for receiving the record command and the record data from an external computer 56 and an input device for the image data such as a line control unit 55 for receiving data received from a public telephone line 57 to allow the apparatus to function as the facsimile transmission and reception apparatus, the copying apparatus and the printing apparats for the external computer. The control unit 24 also connects a console panel 58 to allow the user of the apparatus to conduct various operations and commands.

Three embodiments which use the facsimile apparatus of the above construction as a command apparatus and allow to externally identify the type of the mounted cartridge are explained.

[First Embodiment]

Figure 5:
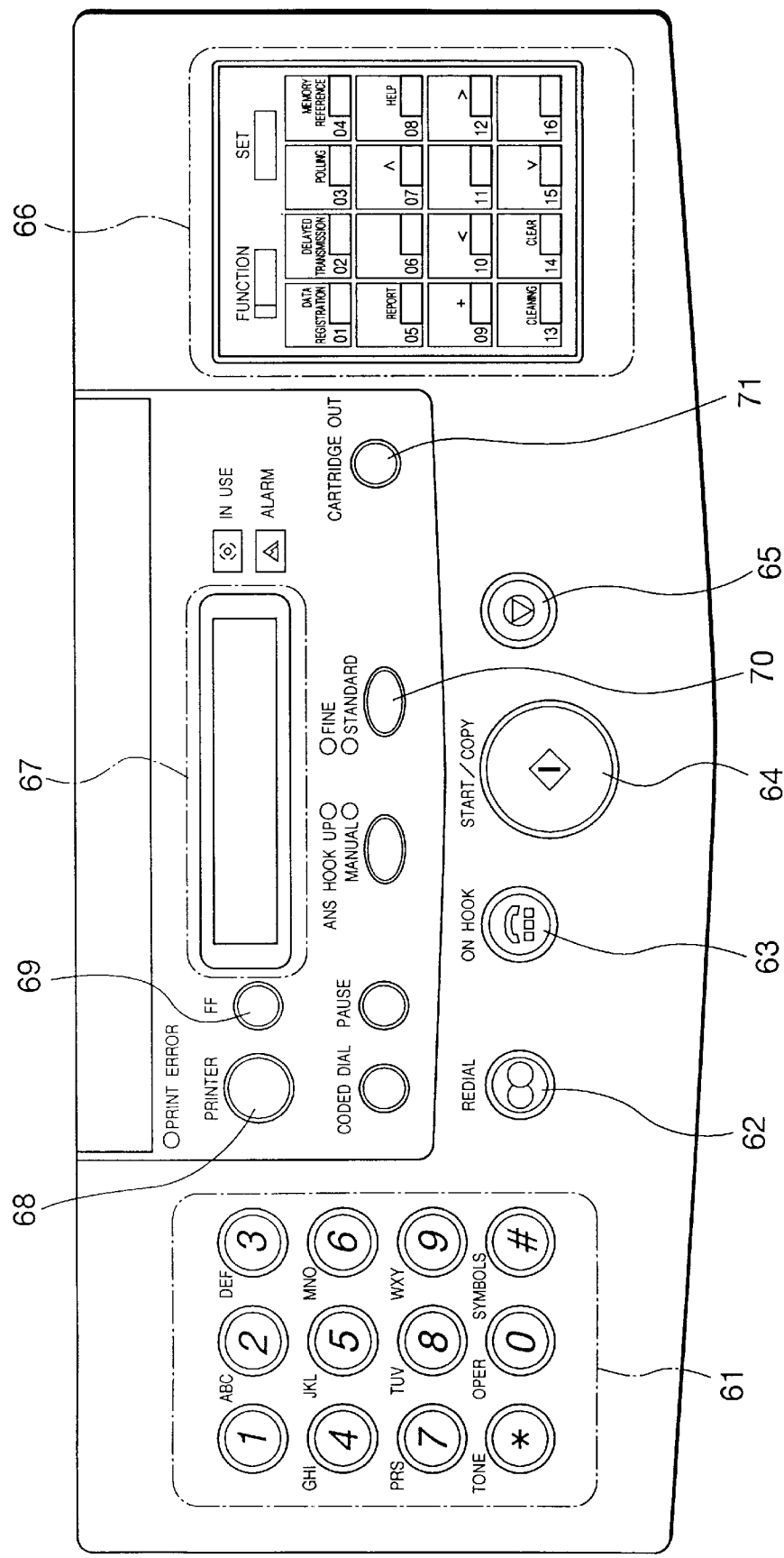
FIG. 5 shows a structural layout of a console panel 58 in accordance with a first embodiment.

FIG. 5 shows a structural layout of a console panel 58 in accordance with a first embodiment. The console panel 58 is provided at a portion of the panel cover of the facsimile apparatus shown in FIG. 1.

In FIG. 5, numeral 61 denotes a dialing key comprising a ten-key for dialing a destination station of the facsimile communication, a "*" key and a "#" key, numeral 62 denotes a redialing key, numeral 63 denotes an on-hook key, numeral 64 denotes a start key for commanding the copying or the facsimile transmission in the facsimile mode, numeral 65 denotes a stop key for commanding the interruption of the facsimile transmission in the facsimile mode, numeral 66 denotes a setting key for setting one-touch dialing and various settings, numeral 67 denotes an LCD panel for displaying a next operation, an error, a notice and a current operation status to inform it to the user, numeral 68 denotes a mode switch for switching between the printer mode and the facsimile mode, numeral 69 denotes a sheet feed key for commanding the sheet feed in the printer mode, numeral 70 denotes a read mode selection key for selecting the mode (a fine mode (FINE) and a standard mode (STANDARD) in reading the image document sheet in the facsimile mode, and numeral 71 denotes a cartridge out key for driving the mounted cartridge out of the apparatus to exchange the recording head cartridge mounted on the apparatus with another cartridge.

The mode switch key 68 is provided with an LED which is lit in the printer mode. When the apparatus is first powered on, the apparatus is automatically set to the facsimile mode to transmit and receive the facsimile image information and record the received image information. In the facsimile mode, the LED of the mode switch key 68 is not lit. When the user of the apparatus depresses the mode switch key 68, the LED provided therein is lit and the apparatus is shifted to the printer mode. When the apparatus is shifted to the printer mode, the apparatus is capable of functioning as a peripheral unit of the external computer connected thereto and functions as a printer to record and output the image information and the text sent from the external computer. When the mode switch key 68 is again depressed during the printer mode, the LED is turned off and the apparatus returns to the facsimile mode.

Figure 6B:
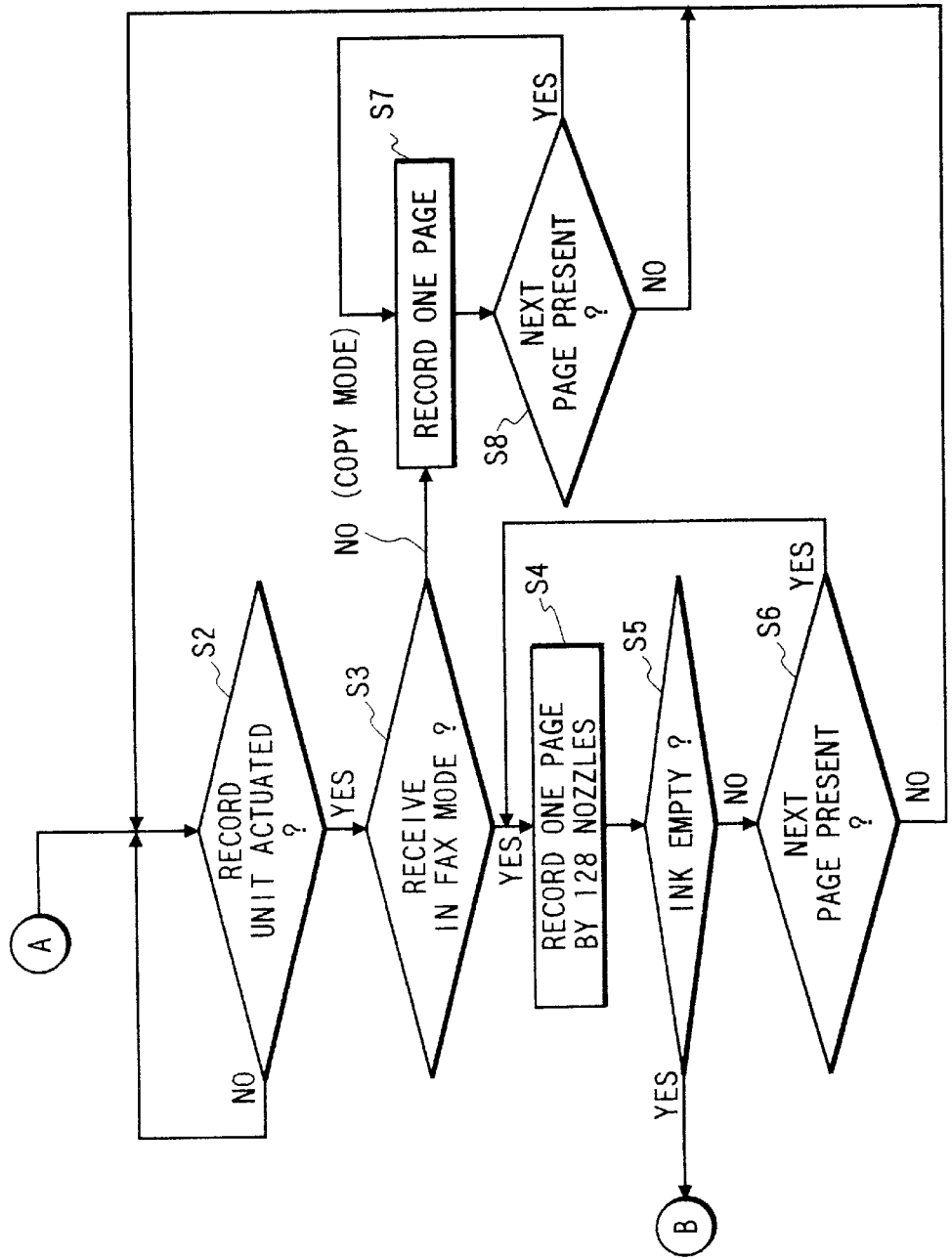
FIG. 6 is comprised of FIGS. 6A and 6B showing flow charts of a recording operation in a facsimile mode in accordance with the first embodiment.

Referring to flow charts of FIGS. 6A and 6B, the record operation in the facsimile mode is explained.

In a step S1, the CPU 25 determines whether the currently mounted cartridge is the monochromatic recording head or the color recording head. If the mounted recording head is the monochromatic recording cartridge, the process proceeds to a step S2 to start the recording operation stand-by state. When a factor for the operation of the recording unit such as the copying or the facsimile reception takes place under this state, the process proceeds to a step S3 to determine whether the factor for the operation of the recording unit is the facsimile reception or not. If the factor for the operation of the recording unit is the facsimile reception, the process proceeds to a step S4, and if the factor for the operation is the copying, the process proceeds to a step S7.

In the step S4, one of the record sheets P stacked in the sheet feed cassette 1 is picked up and fed, and one page of image data is recorded by using the 128 nozzles provided in the monochromatic recording head. In a step S5, the presence or absence of the ink remaining in the ink tank is determined. If the ink is absent, the process proceeds to a step S9 where an error process is conducted and the series of steps are completed. In the error process, the received facsimile image data is stored in the memory, an error message is displayed on the LCD 67 and the recording operation is terminated. When the cartridge is exchanged, the memory outputs the temporarily stored image data.

On the other hand, when the ink is present, the process proceeds to a step S6 to determine whether the next page to be outputted is present or not. If the next page to be outputted is present, the process returns to the step S4 to start the picking up of the next one of the record sheet from the sheet feed cassette 1 and the record operation is repeated. On the other hand, if the page to be outputted is no longer present, the process proceeds to the step S2 to return to the stand-by state.

In the step S7, one page of image document sheet is read to conduct the copy operation, and when it is completed, the process proceeds to a step S8 to determine whether the image document sheet to be copied is present or not. If the image document sheet to be copied is present, the process returns to the step S7 to continue the copy operation, and if the image document sheet to be copied is not present, the process proceeds to the step S2 to return to the stand-by state.

On the other hand, in the step S1, if the mounted cartridge is the color recording head, the process proceeds to a step S10 to display "Exchange Color Cartridge to Black Cartridge" on the LCD panel 67, and the process then proceeds to a step S11 and the apparatus is shifted to the recording operation standby state. During the stand-by state, "Exchange Color Cartridge to Black Cartridge" is continuously displayed on the LCD panel 67. In this state, when a factor for the operation of the recording unit such as the copying and the facsimile reception takes place, the process proceeds to a step S12 to determine whether the factor for the operation of the recording unit is the facsimile reception or not.

If the factor for the operation is the facsimile reception, the process proceeds to a step S13 to record one page of image data by using the 64 nozzles which are the black discharge unit of the color recording head and then the process proceeds to a step S14 to determine whether the ink remains in the ink tank or not.

If the ink is not present, the process proceeds to the step S9 to conduct the error process and the series of steps are terminated. The error process may include the storing of the received facsimile image data in the memory, the displaying the error message on the LCD 67 and the terminating the recording operation. When the cartridge is exchanged, the image data temporarily stored in the memory is outputted.

On the other hand, if the ink is present, the process proceeds to a step S15 to determine whether a next page to be outputted is present or not. If the next page to be outputted is present, the process returns to the step S13 to pick up the next record sheet and the same operation is repeated to record the next page. On the other hand, if the next page is not present, the process returns to the step S10 to display a message "Exchange Color Cartridge to Black Cartridge" on the LCD panel 67, and the apparatus again returns to the stand-by state.

In the step S12, when the factor for the operation of the record unit is the copy command, the process proceeds to a step S16 to copy one page of the image document sheet. Then, in a step S17, whether a next image document sheet to be copied is present or not is determined, and if it is present, the process returns to the step S16 to continue the record operation, and if the image document sheet is no longer present the process returns to the step S10 to display the message "Exchange Color Cartridge to Black Cartridge" on the LCD panel 67 and the apparatus again returns to the stand-by state.

As described above, in accordance with the present embodiment, when the color recording head is mounted in the facsimile mode, the message to prompt to the user of the apparatus to exchange the cartridge is displayed on the LCD panel 67. Thus, the user of the apparatus may readily identify that the currently mounted cartridge is the color recording cartridge. Thus, the exchange of the cartridge to the monochromatic recording head cartridge is prompted and the consumption of the color ink by the facsimile image recording, the preliminary discharging and the suction recovery operation while the user of the apparatus does not notice the mounting of the color recording head is prevented.

[Second Embodiment]

An operation to turn on a predetermined LED on the console panel in the facsimile mode in order to inform the mounting of the color recording head to the user of the apparatus is explained.

Figure 7:
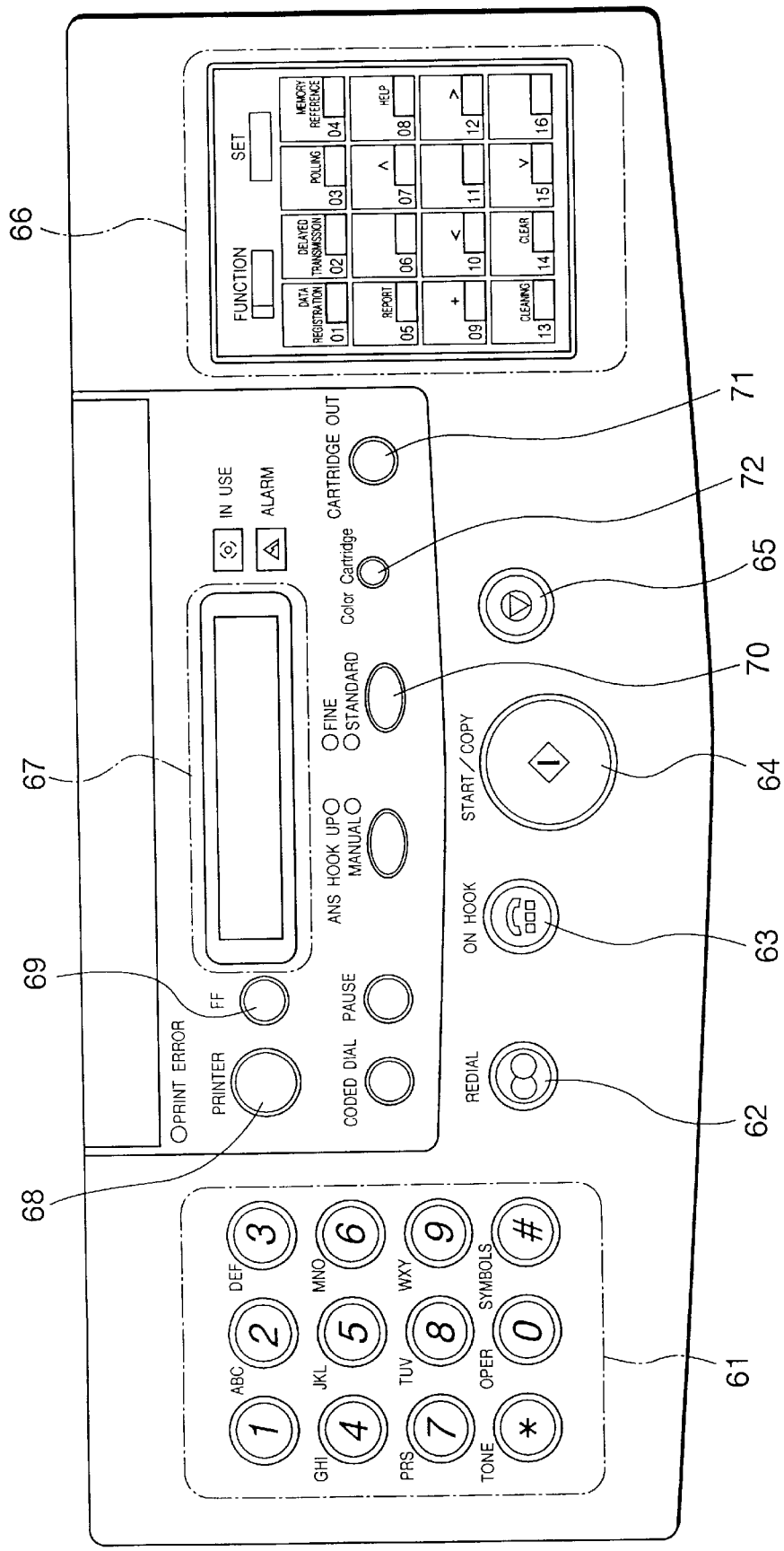
FIG. 7 shows a structural layout of a console panel 58 in accordance with a second embodiment.

FIG. 7 shows a layout of the console panel 58 in accordance with the second embodiment. In FIG. 7, the keys and the panels common to those used in the first embodiment are designated by the same numerals and the explanation thereof is omitted. In FIG. 7, numeral 72 denotes an LED which is lit when the color recording head is mounted in the facsimile mode.

Figure 8B:
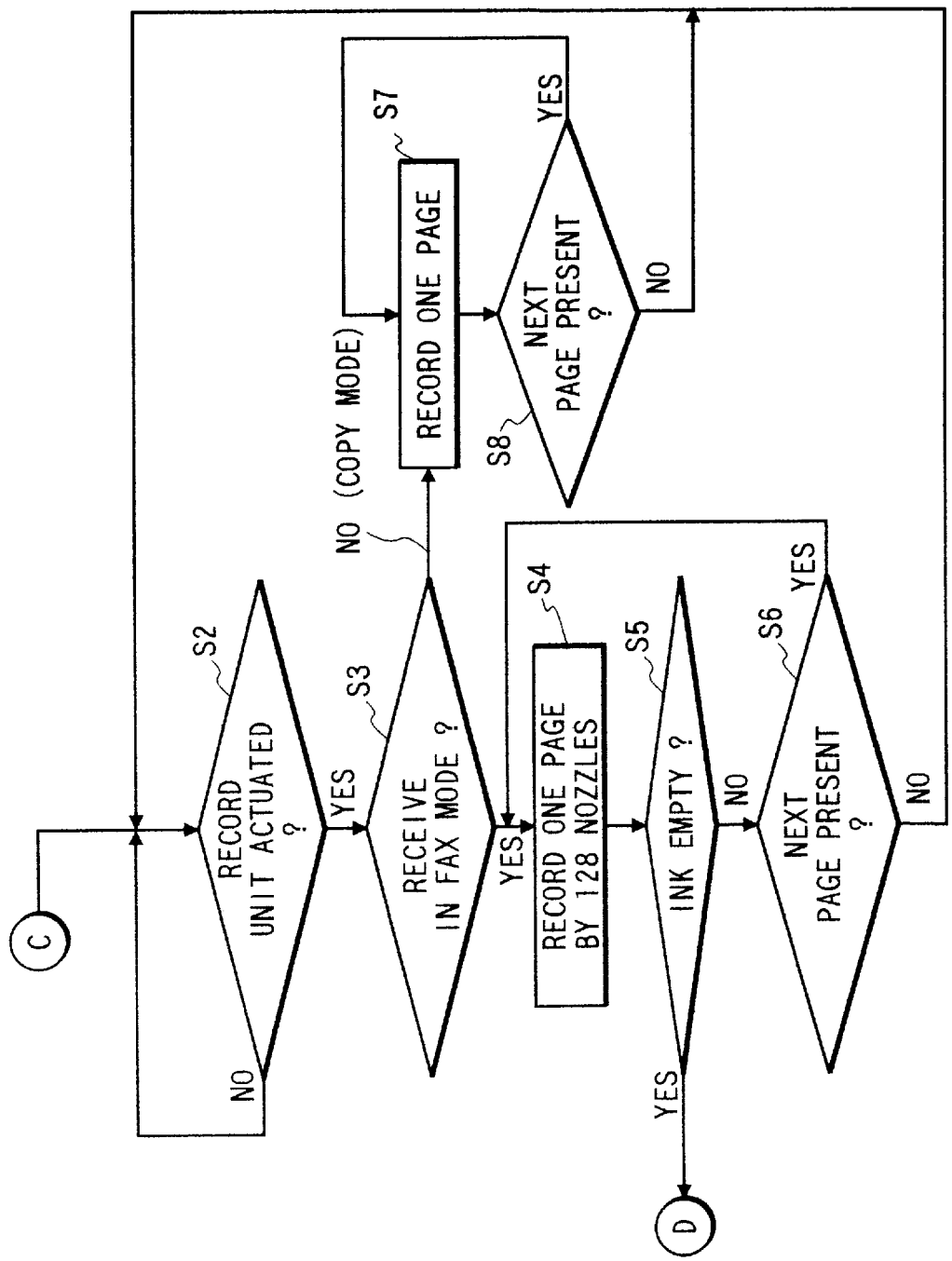
FIG. 8 is comprised of FIGS. 8A and 8B showing flow charts of a recording operation in a facsimile mode in accordance with the second embodiment.

Referring to flow charts of FIGS. 8A and 8B, the recording operation in the facsimile mode in accordance with the present embodiment is explained. In the flow chart, the steps explained in the first embodiment are designated by the same step numbers and the explanation thereof is omitted. Characteristic steps of the present embodiment are explained below.

In the facsimile mode, if it is determined that the mounted cartridge is the color recording head, the process proceeds to a step S10A to turn on the LED 72 on the console panel 58. The subsequent process is same as that of the first embodiment.

In the present embodiment, during the series of steps shown in FIGS. 8A and 8B, the LED 72 on the console panel is turned on and the LED 72 is turned off when the cartridge is changed to the monochromatic recording head.

As described above, in accordance with the present embodiment, when the color recording head is mounted in the facsimile mode, the LED on the console panel is turned on so that the user of the apparatus may readily recognize that the currently mounted cartridge is the color recording head. Thus, the exchange of the cartridge to the monochromatic recording head cartridge is prompted and the consumption of the color ink while the user of the apparatus does not notice the mounting of the color recording head is prevented as it is in the first embodiment.

[Third Embodiment]

An operation to generate sound from the speaker mounted on the console panel 58 to inform to the user that the color recording head is mounted in the facsimile mode is explained.

Figure 9:
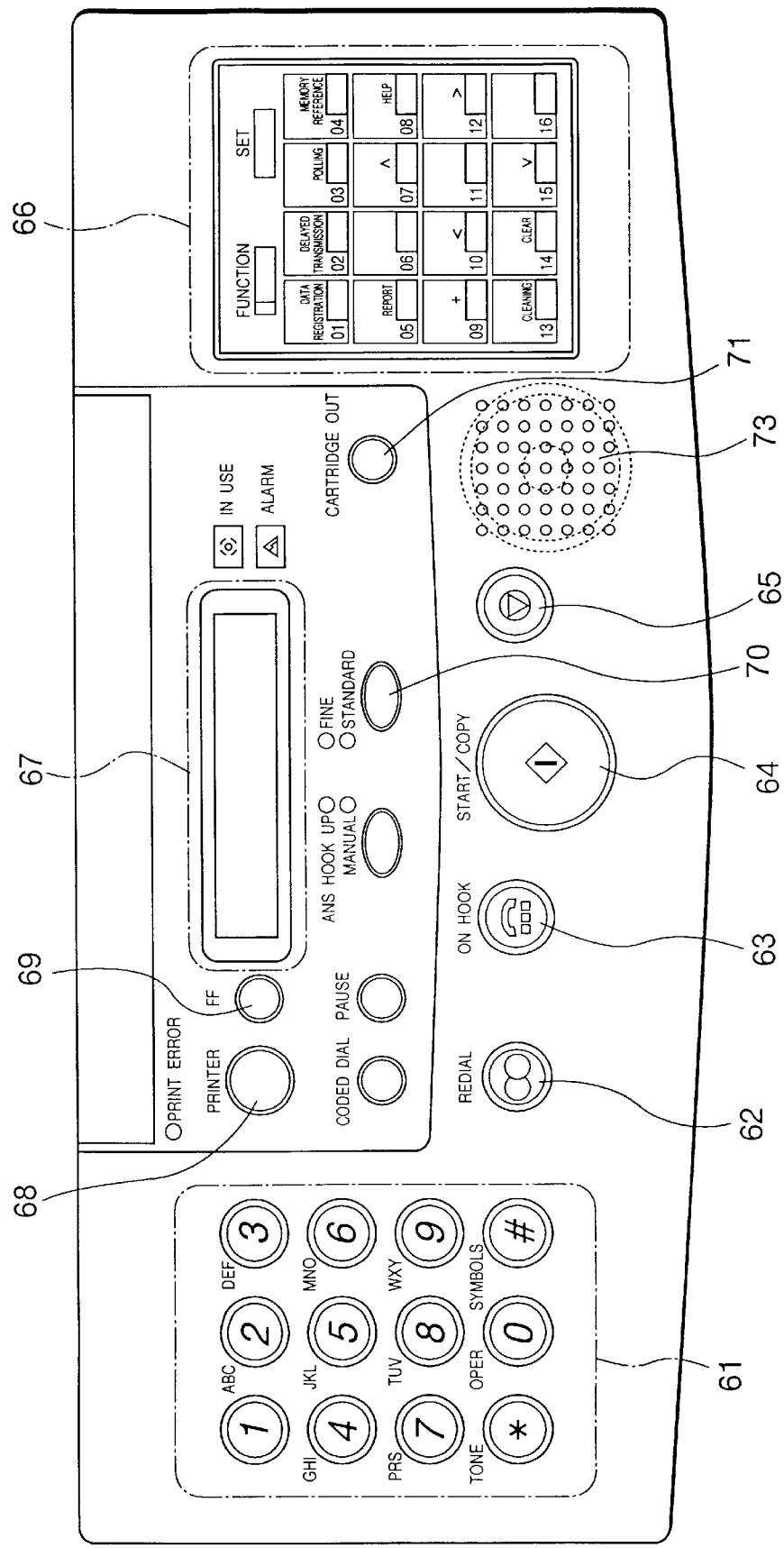
FIG. 9 shows a structural layout of a console panel 58 in accordance with a third embodiment.

FIG. 9 shows a layout of the console panel 58 in accordance with the present embodiment. In FIG. 9, the keys and the panels common to those explained in the first embodiment are designated by the same numerals and the explanation thereof is omitted. In FIG. 9, numeral 73 denotes a speaker for outputting sound when the color recording head is mounted in the facsimile mode.

Figure 10B:
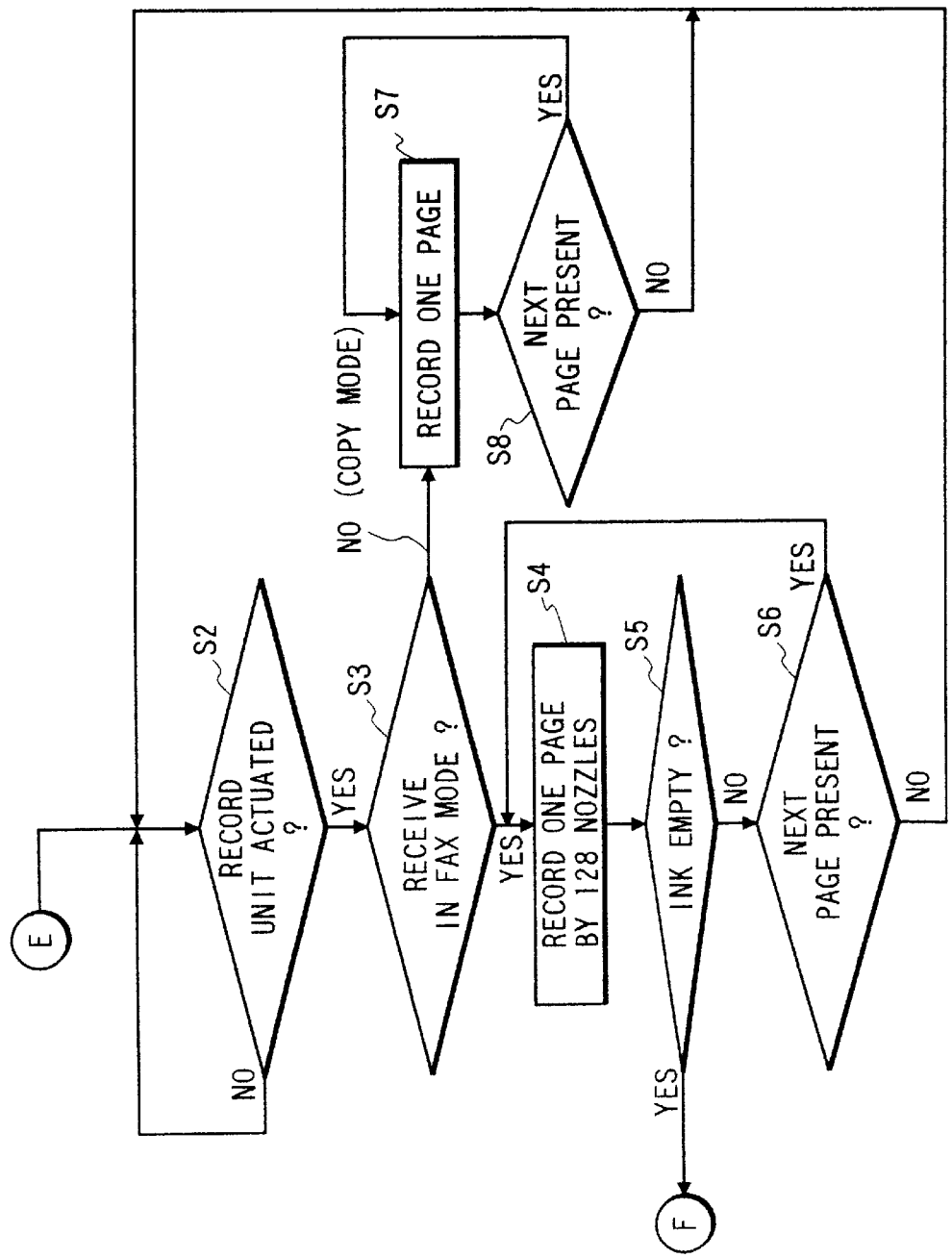
FIG. 10 is comprised of FIGS. 10A and 10B showing flow charts of a recording operation in the facsimile mode in accordance with a third embodiment.
Figure 11B:
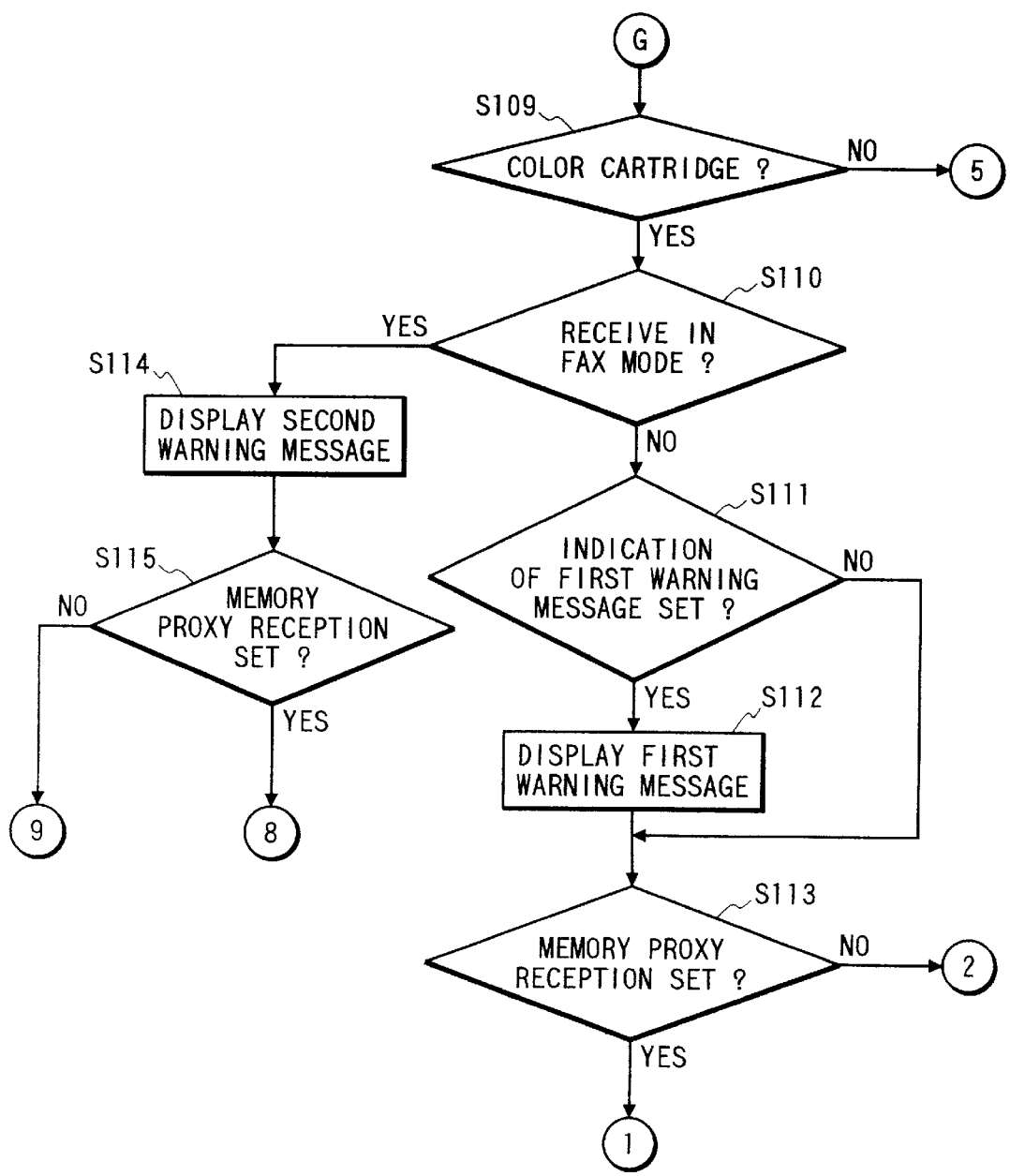
FIG. 11 is comprised of FIGS. 11A and 11B showing flow charts of facsimile reception output control in accordance with a fourth embodiment.
Figure 12B:
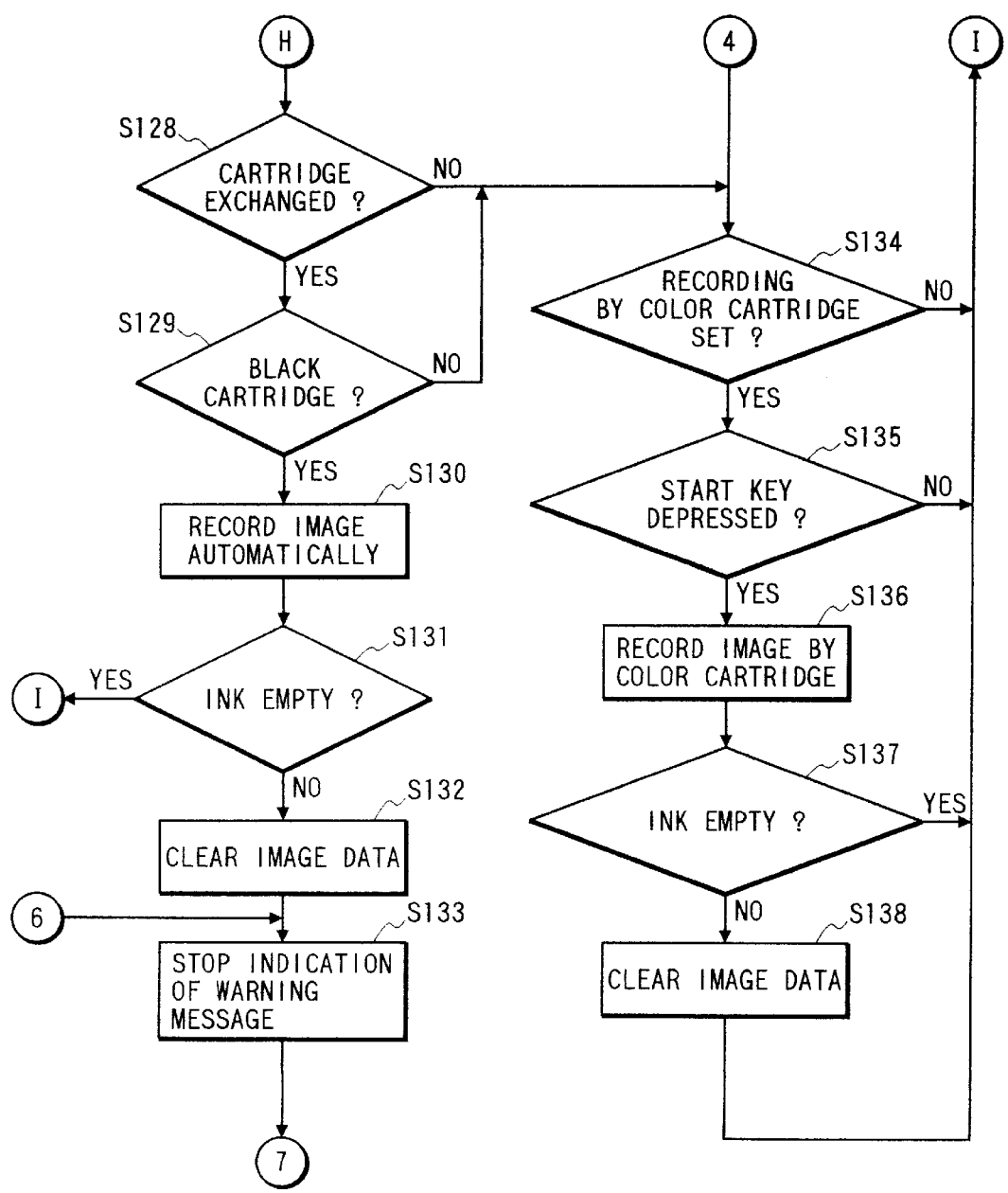
FIG. 12 is comprised of FIGS. 12A and 12B showing flow charts of facsimile reception output control in accordance with the fourth embodiment.
Figure 13:
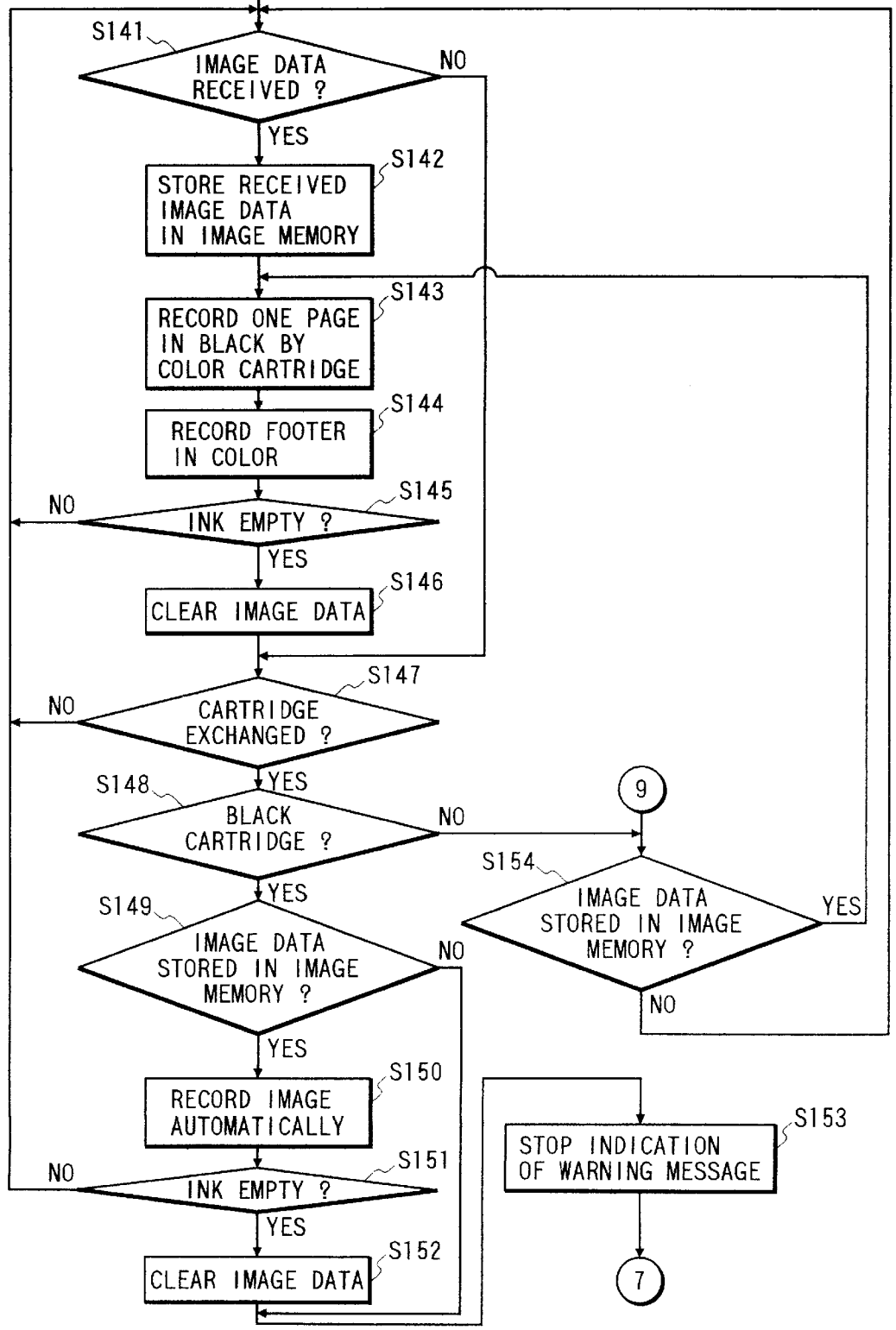
FIG. 13 shows a flow chart of facsimile reception output control in accordance with the fourth embodiment.
Figure 14B:
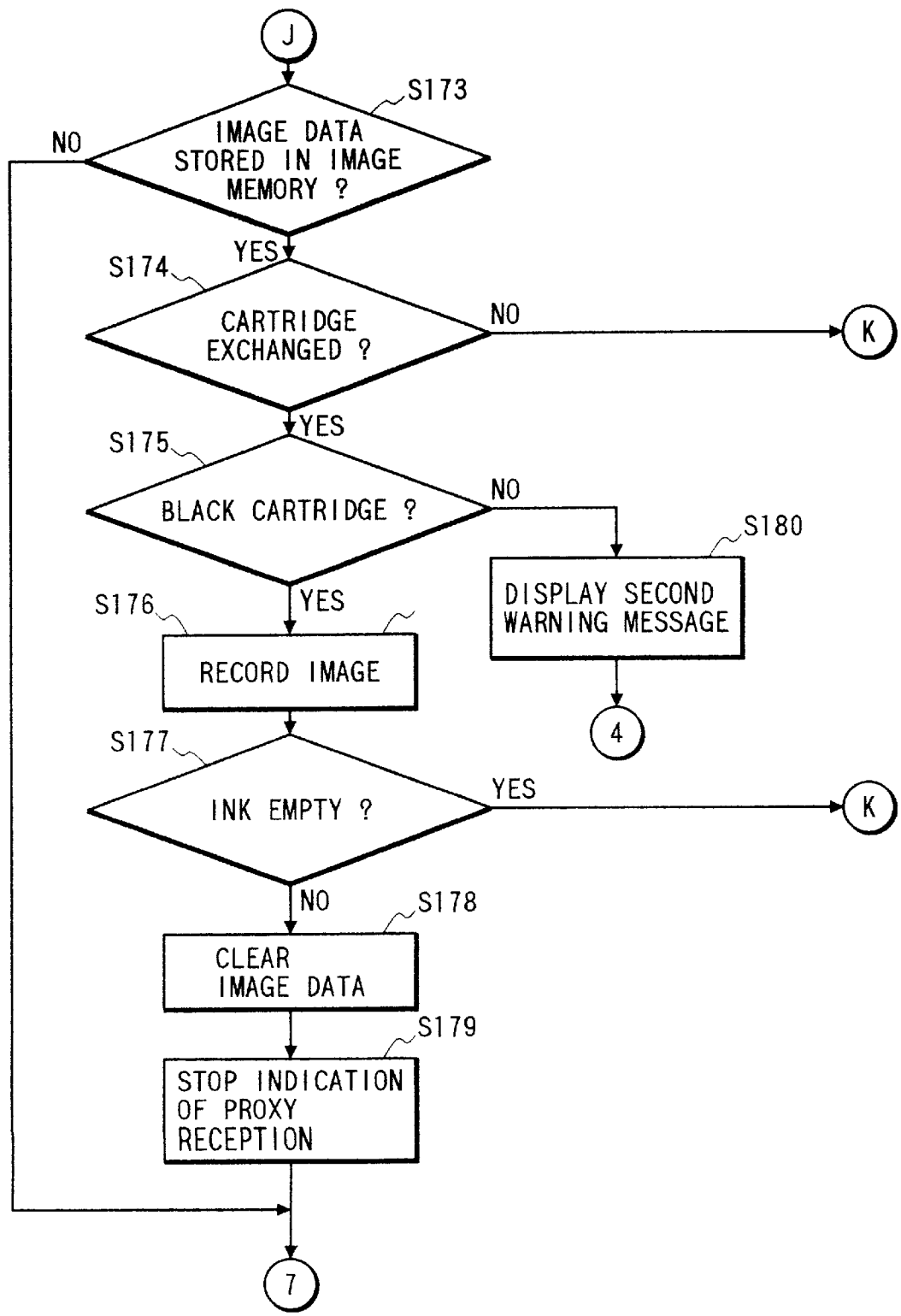
FIG. 14 is comprised of FIGS. 14A and 14B showing flow charts of facsimile reception output control in accordance with the fourth embodiment.

Referring to flow charts of FIGS. 10A and 10B, the recording operation in the facsimile mode in accordance with the present embodiment is explained. In this flow charts, the steps explained in the first embodiment are designated by the same step numbers and the explanation thereof is omitted. Only the characteristic steps of the present embodiment are explained here.

In the facsimile mode, if it is determined that the mounted cartridge is the color recording head, the process proceeds to a step S10B to generate buzzer sound from the speaker 73 on the console panel 58. The subsequent steps are same as those in the first embodiment.

In the present embodiment, during the series of steps shown in FIGS. 10A and 10B, the buzzer sound from the speaker 73 on the console panel 58 is continuously generated and when the cartridge is changed to the monochromatic recording head, the sound is ceased.

In accordance with the present embodiment, when the color recording head is mounted in the facsimile mode, the buzzer sound is generated from the speaker 73 on the console panel so that the user of the apparatus may notice that the currently mounted cartridge is the color recording head. Thus, the exchange of the cartridge to the monochromatic recording head is prompted and the consumption of the color ink while the user of the apparatus does not notice the mounting of the color recording head is prevented as it is in the first and second embodiments.

[Fourth Embodiment]

Another embodiment of the present invention is now explained. In the above embodiments, when the color recording head cartridge is mounted in the facsimile mode, the received image data is recorded by using the 64 black ink discharge nozzles of the color recording head. In the present embodiment, the operator may selectively set whether the recording is made by using the color recording cartridge or it is received in the memory. In the present embodiment, the control unit and the console panel are same as those in the first embodiment.

In the present embodiment, when the facsimile reception occurs during the print operation in the print mode, the received facsimile image is temporarily stored in the image memory (memory proxy reception) so as not to interrupt the print operation, and after the completion of the print operation, the operation mode is switched to the facsimile mode and if the monochromatic cartridge is then mounted, the received image is automatically outputted. Even if a print command is received from the external computer 56 during the reception of the facsimile image, the operation mode of the apparatus is not instantly switched to the printer mode but after the completion of the facsimile reception operation, the operation mode is switched.

The operation condition of the apparatus may be set such that when the facsimile data arrives in the facsimile mode while the color recording ink cartridge is mounted, the received data is temporarily stored in the image memory (memory proxy reception). In this manner, the facsimile data received in the memory may be recorded by the ink other than black by using the currently mounted color recording cartridge or it may be recorded in a reception report (said as a proxy reception report) which records the date and time of reception and the information on the sender. When the cartridge is thereafter changed to the monochromatic recording cartridge, the image data remaining in the image memory, if any, is automatically printed out, the data stored in the image memory is erased and the display of the second warning message is stopped. If the image data is no longer present in the image memory when the cartridge is exchanged, the display of the first warning message is stopped.

In the facsimile apparatus of the construction as described above, the switching of the operation mode and the warning process by the type of the mounted ink cartridge are explained with reference to FIGS. 11A to 14B.

In a step S101, whether the current operation mode is the printer mode or the facsimile mode is determined, and if it is the printer mode, the process proceeds to a step S102, and if it is the facsimile mode, the process proceeds to a step S109.

In the step S102, whether a facsimile image has been received or is being received or not is determined, and if it has been received or being received, the process proceeds to a step S103 to store the received facsimile image in the image memory. In a step S104, a message indicating the memory reception is displayed on the LCD panel 67 and then the process returns to the step S102. On the other hand, if the facsimile image has not been received or is not being received, the process proceeds to a step S105 to determine whether the mode switching to the facsimile mode is due to the manual operation by the depression of the mode switch key 68 or the automatic switching after the elapse of a predetermined time interval.

If the switching is due to the manual operation, the process proceeds to a step S106 to determine whether the mode switch 68 has been depressed or not. If the key has been depressed, the process proceeds to a step S108, and if the key has not been depressed, the process returns to the step S102. On the other hand, if the switching is set to the automatic switching, the process proceeds to a step S107 to determine whether the predetermined time has elapsed since the switching of the mode to the printer mode. If the predetermined time has not elapse, the process proceeds to the step S106, and if the predetermined time has elapsed, the process proceeds to the step S108. In the step S108, the operation mode is switched from the printer mode to the facsimile mode. When the mode switch 68 is depressed in the step S106, the operation mode is switched to the facsimile mode even if the predetermined time has not elapsed from the above process.

When the operation mode is the facsimile mode or when the operation mode is switched to the facsimile mode, the process proceeds to a step S109 to determine the type of the currently mounted ink cartridge, and if it is the color ink cartridge, the process proceeds to a step S110, and if it is the monochromatic ink cartridge, the process proceeds to a step S161.

In the step S110, whether the apparatus has received the facsimile image or not is determined, and if it has received, the process proceeds to a step S114, and if it has not received, the process proceeds to a step S111. In the step S111, whether the user of the apparatus has set the apparatus to display the first warning message or not is determined. If the apparatus is set to display the first warning message, the process proceeds to a step S112 to display the message, and if the apparatus is set not to display the message, the process proceeds to a step S113.

In the step S113, whether the apparatus is set to conduct the memory reception if the facsimile image is received when the color recording cartridge is mounted in the facsimile mode is determined, and if the memory proxy reception is set, the process proceeds to a step S121, and if the memory proxy reception is not set, the process proceeds to a step S141.

In the step S114, the second warning message is displayed on the LCD panel 67, and in a step S115, whether the apparatus has been set to conduct the memory proxy reception if the facsimile image is received when the color recording cartridge is mounted in the facsimile mode is determined, and if the memory reception is set, the process proceeds to a step S127, and if the memory proxy reception is not set, the process proceeds to a step S154.

In the step S121, whether the facsimile data has been received or not is determined. If the reception of the facsimile data is detected, the process proceeds to a step S122 to store the received image data in the image memory. Then, the process proceeds to a step S123 to display the second warning message on the LCD panel 67. In a step S124, whether the apparatus has been set to output the proxy reception report by the color ink (other than the black ink) or to record the image (color recording) is determined. If the color recording is set, the process proceeds to a step S125 to record one page of received image by the color ink, and if the outputting of the proxy reception report by the color ink is set, the process proceeds to a step S126 to output the proxy reception report by the color ink.

Then, the process proceeds to the step S127 to determine whether the image data is stored in the image memory or not, and if the image data is stored, the process proceeds to a step S128, and if the image data is not stored, the process proceeds to a step S139.

In the step S128, whether the cartridge has been exchanged or not is determined. If the cartridge has been exchanged, the process proceeds to a step S129 to determine whether the exchanged cartridge is the monochromatic recording cartridge or not. If the cartridge is the monochromatic recording cartridge, the process proceeds to a step S130 to automatically output the received image. On the other hand, if the cartridge has not been exchanged or if the exchanged cartridge is the color recording cartridge, the process proceeds to a step S134.

In the step S139, whether the cartridge has been exchanged or not is determined. If the cartridge has been exchanged, the process proceeds to a step S140 to determine whether the exchanged cartridge is the monochromatic recording cartridge or not. If the cartridge is the monochromatic cartridge, the process proceeds to a step S133. On the other hand, if the cartridge has not been exchanged or the exchanged cartridge is the color recording cartridge, the process returns to the step S121.

In the step S131, whether the image recording after the exchange of the cartridge is successful or not is determined. It is conducted by checking the amount of ink remaining in the ink tank of the ink cartridge. If the ink remains, it is assumed that the recording is successful, and if the ink does not remain, it is assumed that the recording is not successful. The success/unsuccess of the recording may be determined in other process or manner. When the ink remains, that is, the image recording is successful, the process proceeds to a step S132 to erase the image data in the image memory, and in the step S133, the display of the second warning message is stopped and the process then proceeds to the step S101. On the other hand, if the ink does not remain, that is, the image recording is not successful, the process returns to the step S121 to wait for the exchange of the cartridge.

In the step S134, whether the apparatus has been set to conduct the image recording by the color recording cartridge or not is determined, and if it is set to not to record, the process returns to the step S121. On the other hand, if it is set to record, the process proceeds to a step S135 to determine whether the start key 64 provided at the console panel 58 has been depressed or not. If it has been depressed, the process proceeds to a step S136 to conduct the recording of the image by using the 64 black ink discharging nozzles of the color recording cartridge. On the other hand, if it has not been depressed, the process returns to the step S121.

The image recording by the black ink may be conducted by the combination of yellow (Y) ink, magenta (M) ink and cyan (C) ink.

After the recording, the process proceeds to a step S137 to determine the success/unsuccess of the image recording by detecting the amount of remaining ink. If the ink remains, the process proceeds to a step S138 to erase the image data in the image memory and then the process returns to the step S121. On the other hand, if the ink does not remain, the image data is not erased and the process returns to the step S121 to wait the exchange of the cartridge.

In the step S113, if the apparatus has been set not to conduct the memory reception, the process proceeds to a step S141 to determine whether the facsimile data has been received or not. If the facsimile data has been received, the process proceeds to a step S142 to store the received facsimile data in the image memory, and in a step S143, the received facsimile data is recorded on the record sheet by the black ink by using only the black ink discharging nozzles of the color recording cartridge, and in a step S144, the information such as the reception date and time is recorded by the color ink (other than the black ink) at the bottom of the record sheet as footer information. In a step S145, the amount of remaining ink is checked, and if the ink remains, the process proceeds to a step S146 to erase the image data from the image memory, and if the ink does not remain, the process returns to the step S141. On the other hand, if the facsimile data has not been received, the process proceeds to a step S147.

In the step S147, whether the cartridge has been exchanged or not is determined, and if it has been exchanged, the process proceeds to a step S148, and if it has not been exchanged, the process returns to the step S141. In the step S148, whether the exchanged cartridge is the monochromatic recording cartridge or not is determined, and if it is the monochromatic recording cartridge, the process proceeds to a step S149 and if it is not the monochromatic recording cartridge, the process proceeds to the step S154.

In the step S149, whether the facsimile image data is stored in the image memory or not is determined, and if the image data is stored, the process proceeds to a step S150 to automatically output the image. When the cartridge is changed to the monochromatic recording cartridge, the image data stored in the stored in the image memory is automatically printed out. In the step S151, the amount of remaining ink is checked, and if the ink remains, it is assumed that the recording is successful and the process proceeds to a step S152 to erase the recorded image data from the image memory and the process further proceeds to a step S153. If the ink does not remain, it is assumed that the recording is unsuccessful and the process returns to the step S141. On the other hand, if the facsimile image data is not stored in the image memory, the process proceeds to the step S153.

In the step S153, the display of the first warning message is stopped and then the process returns to the step S101.

On the other hand, in the step S154, whether the received image data is stored in the image memory or not is determined, and if the data is stored, the process returns to the step S143, and if the image data is not stored, the process returns to the step S141.

In the step S109, if the mounted cartridge is the monochromatic recording cartridge, the process proceeds to a step S161 to determine whether the facsimile image data is stored in the image memory or not is determined. If the image data is stored, the process proceeds to a step S162 to automatically print out the image based on the image data. In a step S163, the amount of remaining ink is checked, and if the ink remains, it is assumed that the recording is successful and the process proceeds to a step S164 to erase the recorded image data from the image memory, and the process proceeds to a step S165 to stop the display of the message indicating the memory reception. Then, the process returns to the step S101.

On the other hand, if the ink does not remain, it is assumed that the recording is unsuccessful and the process proceeds to a step S166. In the step S161, if the image data is not stored in the image memory, the process proceeds to the step S166.

In the step S166, whether the facsimile image data has been received or not is determined. If the facsimile image data has been received, the process proceeds to a step S167 to determine whether the data remains in the image memory or not, and if the image data does not remain, the process proceeds to a step S168 to store the received facsimile image data in the image memory. In a step S169, the received facsimile image is recorded. In a step S170, the amount of remaining ink is checked, and if the ink remains, it is assumed that the recording is successful and the process proceeds to a step S171 and then the process returns to the step S101. On the other hand, if the ink does not remain, it is assumed that the recording is not successful and the process returns to the step S166. On the other hand, if the image data remains in the image memory in the step S167, the process proceeds to a step S172 to store the received facsimile image data in the image memory and then the process returns to the step S166.

If the facsimile image data has not been received in the step S166, the process proceeds to a step S173 to determine whether the image data remains in the image memory or not, and if the image data remains, the process returns to the step S101, and if the image data does not remain, the process proceeds to a step S174 to determine whether the cartridge has been exchanged or not.

If the cartridge has been exchanged, the process proceeds to a step S175 and if the cartridge has not been exchanged, the process returns to the step S166. In the step S175, whether the exchanged cartridge is the monochromatic recording cartridge or not is determined. If the cartridge is not the monochromatic recording cartridge, the process proceeds to a step S180 to display the second warning message and then the process proceeds to the step S134. In this manner, when the image data is stored in the image memory and the user of the apparatus does not possess the monochromatic recording cartridge for exchange but possesses only the color recording cartridge, the image data stored in the image memory may be recorded by the black ink by using the black ink discharge nozzles of the color recording cartridge by so setting the apparatus.

On the other hand, when the exchanged cartridge is the monochromatic recording cartridge, the process proceeds to a step S176 to automatically output the image of the image data stored in the image memory. In a step S177, the amount of remaining ink is checked, and if the ink remains, it is assumed that the recording is successful and the process proceeds to a step S178 to erase the recorded image data from the image memory, and the process proceeds to a step S179 to stop the display of the message indicating the memory reception. Then, the process returns to the step S101. On the other hand, if the ink does not remain, it is assumed that the recording is unsuccessful and the process returns to the step S166.

In according with the present embodiment, when the operation mode is switched to the facsimile mode and the color recording cartridge is mounted, the mounting of the improper cartridge is informed to the user of the apparatus to prompt the exchange of the cartridge. Further, if the data remains in the image memory, the image is outputted by using the currently mounted cartridge while the exchanged of the cartridge is prompted and a vacant area of the image memory is secured to prevent the failure of the reception of the data by the full state of the image memory. Further, even when the user of the apparatus possesses only the color recording cartridge as the exchange cartridge, the facsimile image memory may be outputted.

The present invention is particularly suitably usable in an ink jet recording head and an recording apparatus in which an electro-thermal transducer, a laser beam or the like is used to cause a change of state of the ink to eject or discharge the ink, because the high density of pixels and high resolution of recording are attained.

The typical construction and the operational principles are preferably the ones disclosed in U.S. Pat. No. 4,723,129 and U.S. Pat. No. 4,740,796. The principle and the structure are applicable to a so-called on-demand type recording system and a continuous type recording system. Particularly, however, it is suitable for the on-demand type because the principle is such that at least one driving signal is applied to an electro-thermal transducer disposed on a liquid (ink) retaining sheet or liquid passage, the driving signal being large enough to provide such a quick temperature rise beyond a departure from nucleation boiling point, by which the thermal energy is provided by the electro-thermal transducer to produce film boiling on the heating portion of the recording head, whereby a bubble can be formed in the liquid (ink) corresponding to each of the driving signals. By the generation, development and contraction of the bubbles, the liquid (ink) is ejected through an discharge port to produce at least one droplet. The driving signal is preferably in the form of pulse because the development and the contraction of the bubbles can be effected instantaneously, and therefore the liquid (ink) is ejected with fast response. The driving signal is preferably such as those disclosed in U.S. Pat. No. 4,463,359 and U.S. Pat. No. 4,345,262. In addition, the temperature rise rate of the heating surface is preferably such as those disclosed in U.S. Pat. No. 4,313,124.

The structure of the recording head may be those shown in U.S. Pat. No. 4,558,333 and U.S. Pat. No. 4,459,600 in which the heating portion is disposed at a bent portion, as well as the structure of the combination of the ejection outlet, liquid passage and the electro-thermal transducer disclosed in the above-mentioned patents. In addition, the present invention is applicable to the structure disclosed in Japanese Laid-Open Patent Application No. 59-123670 in which a common slit is used as the discharge port for a plurality of electrothermal transducers, and the structure disclosed in Japanese Laid-Open Patent Application No. 59-138461 in which an opening for absorbing a pressure wave of thermal energy is formed corresponding to the discharge port.

As a full-line type recording head having a length corresponding to a maximum width of the record medium on which the recording apparatus can record, the length may be satisfied by a combination of a plurality or recording heads disclosed herein or a single integrally constructed recording head may be used.

Further, the present invention is applicable to a replaceable chip type recording head to which the ink is supplied by electrical connection with the apparatus main body or from the apparatus main body when the recording head is mounted on the apparatus main body, or to a cartridge type recording head having an ink tank integral with the recording head.

The provision of the recovery means and/or the auxiliary means for the preliminary operation are preferable because they further stabilize the effects of the present invention. As for such means, these are capping means of the recording head, cleaning means therefor, pressing or sucking means, preliminary heating means which may be an electro-thermal transducer, an additional heating element or a combination thereof. Also, means for effecting preliminary discharge (not for the recording) may stabilize the recording operation.

As regards recording mode of a recording apparatus, there may be applicable at least one of a monochromatic mode with a main color such as black, a multi-color mode with different color inks and/or full color mode using the mixture of colors, which may be an integrally formed recording unit or a combination of a plurality of recording heads.

Furthermore, in the foregoing embodiment, the ink is liquid. Alternatively, ink which is solidified below a room temperature and liquefied at a room temperature may be used. Since the ink is controlled within a temperature range of not lower than 30° C. and not higher than 70° C. to stabilize the viscosity of the ink to provide the stable discharge in a conventional recording apparatus of this type, the ink may be such that it is liquid within the temperature range when the recording signal is applied.

In one of them, the temperature rise due to the thermal energy is positively prevented by consuming it for the state change of the ink from the solid state to the liquid state. Other ink is solidified when it is left, to prevent the evaporation of the ink. In any case, the application of the recording signal producing thermal energy, the ink is liquefied, and the liquefied ink may be discharged. Other ink may start to be solidified at the time when it reaches the recording sheet. The present invention is also applicable to the ink which is liquefied by the application of the thermal energy. Such ink may be retained in liquid state or solid state in holes or recesses formed in a porous sheet as disclosed in Japanese Laid-Open Patent Application No. 54-56847 and Japanese Laid-Open Patent Application No. 60-71260. The sheet is faced to the electro-thermal transducers. The most effective one of the inks described above is the film boiling system.

The ink jet recording apparatus may be used as an output terminal of an information processing apparatus such as a computer or the like, as a copying machine combined with an image reader or the like, or as a facsimile machine having information sensing and receiving functions.

The present invention may be applied to a system comprising a plurality of units or an apparatus comprising a single unit. The present invention may also be implemented by supplying a program to the system or the apparatus. In this case, a storage medium storing the program of the present invention constitutes an invention. By reading the program from the storage medium, the system or the apparats is operated in the predetermined manner.

What is claimed is:

1. An image recording apparatus having recording means for recording an image on a recording medium by selectively mounting a monochromatic recording head and a color recording head, said apparatus operable in a plurality of operation modes including a communication mode for receiving data sent over a communication line, said recording means recording on the recording medium an image corresponding to data received in the communication mode, said apparatus comprising:

mounting means for mounting at least one of the monochromatic recording head and the color recording head;
   communication means for receiving data over the communication line;
   discrimination means for discriminating whether the recording head mounted by said mounting means is the monochromatic recording head or the color recording head;
   selection means for selecting one of the plurality of operation modes; and
   information output means for outputting alarm information in accordance with a discrimination result by said discrimination means and an operation mode selected by said selection means,
   wherein, in case said discrimination means discriminates that the mounted recording head is the color recording head and said selection means selects the communication mode, said information output means outputs the alarm information.

2. An image recording apparatus according to claim 1, wherein said monochromatic recording head discharges black recording agent to conduct monochromatic recording and said color recording head discharges a plurality of color recording agents to conduct color recording.

3. An image recording apparatus according to claim 1 wherein said information output means includes display means for displaying a message.

4. An image recording apparatus according to claim 3 wherein said display means includes an LCD.

5. An image recording apparatus according to claim 1 wherein said information output means includes an LED lamp.

6. An image recording apparatus according to claim 1 wherein said information output means includes a speaker.

7. An image recording apparatus according to claim 1, wherein said monochromatic and color recording head are ink jet recording heads for recording by discharging inks.

8. An image recording apparatus according to claim 1, wherein said monochromatic and color recording heads are recording heads for discharging inks by utilizing thermal energy and have thermal energy transducers for generating the thermal energy to be supplied to the ink.

9. A facsimile machine, comprising:

reading means for reading an image document sheet;
   communication means for transmitting/receiving data via a communication line, said communication means transmitting data read by said reading means,
   mounting means for mounting at least one of a monochromatic recording head and a color recording head;
   recording means for recording an image on a recording medium, said recording medium using the recording head selectively mounted by said mounting means;
   discrimination means for discriminating whether the recording head mounted by said mounting means is the monochromatic recording head or the color recording head;
   selection means for selecting one of a plurality of operation modes including a communication mode for receiving data sent over a communication line by said communication means;
   information output means for outputting alarm information in accordance with a discrimination result by said discrimination means and an operation mode selected by said selection means,
   wherein in case said discrimination means discriminates that the mounted recording head is the color recording head and said selection means selects the communication mode, said information output means outputs the alarm information.

10. A facsimile apparatus according to claim 9 further comprising copy control means for controlling the recording to copy the image on the record sheet based on the image data of the image document sheet read by said read means.

11. A facsimile apparatus according to claim 10 further comprising input means for inputting print data from an external unit.

12. A facsimile apparatus according to claim 11 further comprising switching means for switching between a first operation mode for conducting the print outputting based on the print data and a second operation mode for conducting the image recording based on the image signal received by said communication means or the image data of the image document sheet read by said read means.

13. A facsimile apparatus according to claim 12 wherein said discrimination means discriminates when said apparatus operates in said second operation mode.

14. A facsimile apparatus according to claim 9, wherein said first recording head discharges black recording agent to conduct monochromatic recording and said second recording head discharges a plurality of color recording agents to conduct color recording.

15. A facsimile apparatus according to claim 9 wherein said information output means includes a display means for displaying a message.

16. A facsimile apparatus according to claim 15 wherein said display means includes an LCD.

17. A facsimile apparatus according to claim 9 wherein said information output means includes an LED lamp.

18. A facsimile apparatus according to claim 9 wherein said information output means includes a speaker.

19. A facsimile apparatus according to claim 9, wherein said first and second recording heads are ink jet recording heads for recording by discharging inks.

20. A facsimile apparatus according to claim 9, wherein said first and second recording heads are recording heads for discharging inks by utilizing thermal energy and have thermal energy transducers for generating the thermal energy to be supplied to the ink.

21. An image recording apparatus having recording means for recording an image on a recording medium by selectively mounting a monochromatic recording head and a color recording head, said apparatus operable in a plurality of operation modes including a communication mode for receiving information sent over a communication line, said recording means recording on the recording medium an image corresponding to data received in the communication mode, said apparatus comprising:

mounting means for mounting at least one of the monochromatic recording head and the color recording head;

communication means for receiving data over the communication line;

discrimination means for discriminating whether the recording head mounted by said mounting means is the monochromatic recording head or the color recording head;

memory means for storing the data received by said communication means;

setting means for setting whether a proxy reception for storing and holding data received by said communication means in the memory means is to be executed; and control means for controlling said memory means in accordance with the setting by said setting means and a discrimination result by said discrimination means, wherein in case said discrimination means discriminates that the mounted recording head is the color recording head and said setting means sets the proxy reception, said control means controls the memory means so that data received by said communication means may be stored and held in the memory means.

22. An image recording apparatus according to claim 21 further comprising display control means for controlling to display by said display means a first message indicating the type of the mounted recording head when the operation mode is switched from said second operation mode to said first operation mode, while said second recording head is mounted.

23. An image recording apparatus according to claim 22 wherein said display control means control to display by said display means a second message for prompting the exchange of the recording head to said first recording head when the data is received by said communication means during the first operation mode while said second recording head is mounted.

24. An image recording apparatus according to claim 23 wherein said display control means includes command means for commanding the suppression of the display of said first and second message and the release of the suppression.

25. An image recording apparatus according to claim 22 wherein said display means includes an LCD.

26. An image recording apparatus according to claim 21 wherein said first recording head is a recording head for conducting monochromatic recording by discharging black ink and said second recording head is a recording head for conducting color recording by discharging a plurality of color inks.

27. An image recording apparatus according to claim 26 wherein said control means controls to record by the color ink other than the black ink by using said second recording head without waiting the mounting of said first recording head when data is received by said communication means during the operation in the first operation mode while said second recording head is mounted.

28. An image recording apparatus according to claim 26 wherein said control means controls to record the reception date and time and the information of the sender by the color ink other than the black ink by using said second recording head without waiting for the mounting of said first recording head when data is received by said communication means during the operation in the first operation mode while said second recording head is used.

29. An image recording apparatus according to claim 26 wherein said control means controls to record by black by using said second recording head without waiting for the mounting of said first recording head when data is received by said communication apparatus during the operation is the first operation mode while said second recording head is mounted.

30. An image recording apparatus according to claim 29 wherein said control means controls to record the reception date and time and the information on the sender on the record medium on which the received data is recorded by using the color ink other than the black ink by using said second recording head.

31. An image recording apparatus according to claim 21 wherein said control means controls to store the received data in said memory means and switch the operation mode from the second operation mode to the first operation mode when data is received by said communication means during the operation in the second operation mode.

32. An image recording apparatus according to claim 31 wherein said control means controls to conduct to read the received data stored in said memory means and conduct the image recording by said recording means when the mounting of said first recording head is detected by said discrimination means.

33. An image recording apparatus according to claim 21 wherein when the image data input does not occur from said host for a predetermined time period in the second operation mode, the operation mode is automatically returned to the first operation mode.

34. An image recording apparatus according to claim 21 wherein said first and second recording heads are ink jet recording heads for recording by discharging inks.

35. An image recording apparatus according to claim 21 wherein said first and second recording heads are recording heads for discharging inks by utilizing thermal energy, and have thermal energy transducers for generating thermal energy to be applied to the ink.

36. An image recording apparatus according to claim 21 further comprising monitor means for monitoring whether the received data is stored in said memory means or not.

37. An image recording apparatus having recording means for recording an image on a recording medium by selectively mounting a first recording head capable of recording in a predetermined color and a second recording head capable of recording in plural colors including the predetermined color, said apparatus operable in a plurality of operation modes including a communication mode for receiving data sent over a communication line, said recording means recording on the recording medium an image corresponding to data received in the communication mode, said apparatus comprising:

mounting means for mounting at least one of the first recording head and the second recording head;

communication means for receiving data over the communication line;

discrimination means for discriminating whether the recording head mounted by said mounting means is the first recording head or the second recording head;

selection means for selecting one of the plurality of operation modes; and information output means for outputting alarm information in accordance with a discrimination result by said discrimination means and an operation mode selected by said selection means, wherein, in case said discrimination means discriminates that the mounted recording head is the second recording head and said selection means selects the communication modes, said information output means outputs the alarm information.

38. An image recording apparatus according to claim 37, wherein said first recording head discharges black recording agent to conduct monochromatic recording and said second recording head discharges a plurality of color recording agents to conduct color recording.

39. An image recording apparatus according to claim 37, wherein said information output means includes display means for displaying a message.

40. An image recording apparatus according to claim 39, wherein said display means includes an LCD.

41. An image recording apparatus according to claim 37, wherein said information output means includes an LED lamp.

42. An image recording apparatus according to claim 37, wherein said information output means includes a speaker.

43. An image recording apparatus according to claim 37, wherein said first and second recording heads are ink jet recording heads for recording by discharging inks.

44. An image recording apparatus according to claim 37, wherein said first and second recording heads are recording heads for discharging inks by utilizing thermal energy and have thermal energy transducers for generating the thermal energy to be supplied to the ink.

45. A facsimile machine, comprising:

reading means for reading an image document sheet;

communication means for transmitting/receiving data via a communication line, said communication means transmitting data read by said reading means;

mounting means for mounting at least one of a first recording head capable of recording in a predetermined color and a second recording head capable of recording in plural colors including the predetermined color;

recording means for recording an image on a recording medium, said recording medium using the recording head selectively mounted by said mounting means;

discrimination means for discriminating whether the recording head mounted by said mounting means is the monochromatic recording head or the color recording head;

selection means for selecting one of a plurality of operation modes including a communication mode for receiving data sent over a communication line by said communication means; and information output means for outputting alarm information in accordance with a discrimination result by said discrimination means and an operation mode selected by said selection means;

wherein in a case discrimination means discriminates that the mounted recording head is the second recording head and said selection means selects the communication mode, said information output means outputs the alarm information.

46. A facsimile apparatus according to claim 45, further comprising copy control means for controlling the recording to copy the image on the record sheet based on the image data of the image document sheet read by said read means.

47. A facsimile apparatus according claim 46, further comprising input means for inputting print data from an external unit.

48. A facsimile apparatus according to claim 47, further comprising switching means for switching between a first operation mode for conducting the print outputting based on the print data and a second operation mode for conducting the image recording based on the image signal received by said communication means or the image data of the image document sheet read by said read means.

49. A facsimile apparatus according to claim 48, wherein said discrimination means discriminates when said apparatus operates in said second operation mode.

50. A facsimile apparatus according to claim 45, wherein said first recording head discharges black recording agent to conduct monochromatic recording and said second recording head discharges a plurality of color recording agents to conduct color recording.

51. A facsimile apparatus according to claim 45, wherein said information output means includes a display means for displaying a message.

52. A facsimile apparatus according to claim 51, wherein said display means includes an LCD.

53. A facsimile apparatus according to claim 45, wherein said information output means includes an LED lamp.

54. A facsimile apparatus according claim 45, wherein said information output means includes a speaker.

55. A facsimile apparatus according claim 45, wherein said first and second recording heads are ink jet recording heads for recording by discharging inks.

56. A facsimile apparatus according to claim 45, wherein said first and second recording heads are recording heads for discharging inks by utilizing thermal energy and have thermal energy transducers for generating the thermal energy to be supplied to the ink.

57. An image recording apparatus having recording means for recording an image on a recording medium by selectively mounting a first recording head capable of recording om on a predetermined color and a second recording head capable of recording in plural colors including the predetermined color, said apparatus operable in a plurality of operation modes including a communication mode for receiving information sent over a communication line, said recording means recording on the recording medium an image corresponding to data received in the communication mode, said apparatus comprising:

mounting means for mounting at least one of the first recording head and the second recording head;

communication means for receiving data over the communication line;

discrimination means for discriminating whether the recording head mounted by said mounting means is the first recording head or the second recording head;

memory means for storing the data received by said communication means;

setting means for setting whether a proxy reception for storing and holding data received by said communication means in the memory means is to be executed; and control means for controlling said memory means in accordance with the setting by said setting means and discrimination result by said discrimination means, wherein in case said discrimination means discriminates that the mounted recording head is the second recording head and said setting means sets the proxy reception, said control means controls the memory means so that data received by said communication means may be stored and held in the memory means.

58. An image recording apparatus according to claim 57, further comprising display control means for controlling to display by said display means a first message indicating the type of the mounted recording head when the operation mode is switched from said second operation mode to said first operation mode while said second recording head is mounted.

59. An image recording apparatus according to claim 58, wherein said display control means control to display by said display means a second message for prompting the exchange of the recording head to said first recording head when the data is received by said communication means during the first operation mode while said second recording head is mounted.

60. An image recording apparatus according to claim 59, wherein said display control means includes command means for commanding the suppression of the display of said first and second message and the release of the suppression.

61. An image recording apparatus according to claim 58, wherein said display means includes an LCD.

62. An image recording apparatus according to claim 57, wherein said first recording head is a recording head for conducting monochromatic recording by discharging black ink and said second recording head is a recording head for conducting color recording by discharging a plurality of color inks.

63. An image recording apparatus according to claim 62, wherein said control means controls to record by the color ink other than the black ink by using said second recording head without waiting the mounting of said first recording head when data is received by said communication means during the operation in the first operation mode while said second recording head is mounted.

64. An image recording apparatus according to claim 62, wherein said control means controls to record the reception date and time and the information of the sender by the color ink other than the black ink by using said second recording head without waiting for the mounting of said first recording head when data is received by said communication means during the operation in the first operation mode while said second recording head is used.

65. An image recording apparatus according to claim 62, wherein said control means controls to record by black by using said second recording head without waiting for the mounting of said first recording head when data is received by said communication apparatus during the operation is the first operation mode while said second recording head is mounted.

66. An image recording apparatus according to claim 65, wherein said control means controls to record the reception date and time and the information on the sender on the record medium on which the received data is recorded by using the color ink other than the black ink by using said second recording head.

67. An image recording apparatus according to claim 57, wherein said control means controls to store the received data in said memory means and switch the operation mode from the second operation mode to the first operation mode when data is received by said communication means during the operation in the second operation mode.

68. An image recording apparatus according to claim 67, wherein said control means controls to conduct to read the received data stored in said memory means and conduct the image recording by said recording means when the mounting of said first recording head is detected by said discrimination means.

69. An image recording apparatus according to claim 57, wherein when the image data input does not occur from said host a predetermined time period in the second operation mode, the operation mode is automatically returned to the first mode.

70. An image recording apparatus according to claim 57, wherein said first and second recording heads are ink jet recording heads for recording by discharging inks.

71. An image recording apparatus according to claim 57, wherein said first and second recording heads are recording heads for discharging inks by utilizing thermal energy, and have thermal energy transducers for generating thermal energy to be applied to the ink.

72. An image recording apparatus according to claim 57, further comprising monitor means for monitoring whether the received data is stored in said memory means or not.

* * * * *

UNITED STATES PATENT AND TRADEMARK OFFICE
CERTIFICATE OF CORRECTION

PATENT NO. : 6,082,847

DATED : July 4, 2000

INVENTORS : Takayuki Nishinohara, et al.

It is certified that error appears in the above-identified patent and that said Letters Patent is hereby corrected as shown below:

COLUMN 3

Line 37, "transfer" should read --transfers--;
  Line 39, "to" should read --on--; and
  Line 46, "sheet" should read --sheets--.

COLUMN 4

Line 6, "directing" should read --direction--; and
  Line 25, "form" should read --from--.

COLUMN 5

Line 10, "head" should read --heat--; and
  Line 61, "cable." should read --cable 19.-- and
  "head" should read --head 5--.

COLUMN 6

Line 2, "receive" should read --reception--;
  Line 12, "carriage" should read --carriage 15-- and
  "moved" should read --is moved--; and
  Line 36, "recording head" should read --recording head 5--.

UNITED STATES PATENT AND TRADEMARK OFFICE
CERTIFICATE OF CORRECTION

PATENT NO. : 6,082,847

DATED : July 4, 2000

INVENTORS : Takayuki Nishinohara, et al.

Page 2 of 4

It is certified that error appears in the above-identified patent and that said Letters Patent is hereby corrected as shown below:

COLUMN 7

Line 39, "apparats" should read --apparatus--.

COLUMN 8

Line 2, "(STANDARD)" should read --(STANDARD))--.

COLUMN 9

Line 50, "to" (second occurrence) should be deleted.

COLUMN 10

Line 5, "BB," should read --8B,--.

COLUMN 11

Line 55, "or being" should read --or is being--.

COLUMN 12

Line 8, "elapse," should read --elapsed,--;
Line 23, "received," should read --been received,--; and
Line 24, "received," should read --been received,--.

UNITED STATES PATENT AND TRADEMARK OFFICE
CERTIFICATE OF CORRECTION

PATENT NO. : 6,082,847

DATED : July 4, 2000

INVENTORS : Takayuki Nishinohara, et al.

It is certified that error appears in the above-identified patent and that said Letters Patent is hereby corrected as shown below:

COLUMN 14

Line 21, "the stored in" should be deleted; AND
Line 42, "not is determined." should read --not.--.

COLUMN 15

Line 49, "exchanged" should read --exchange--.

COLUMN 16

Line 38, "or" should read --of--.

COLUMN 18

Line 12 "head" should read --heads--;
Line 49, "read means." should read --reading means.--; and
Line 59, "read means." should read --reading means.--.

COLUMN 20

Line 29, "is" should read --in--.

UNITED STATES PATENT AND TRADEMARK OFFICE
CERTIFICATE OF CORRECTION

PATENT NO. : 6,082,847

DATED : July 4, 2000

INVENTORS : Takayuki Nishinohara, et al.   Page 4 of 4

It is certified that error appears in the above-identified patent and that said Letters Patent is hereby corrected as shown below:

<u>COLUMN 23</u>

Line 11, "discrimination" should read --a discrimination--.

Signed and Sealed this

Twenty-fourth Day of April, 2001

Attest:

NICHOLAS P. GODICI

Attesting Officer    Acting Director of the United States Patent and Trademark Office